US012209729B2

(12) United States Patent
Bernard et al.

(10) Patent No.: US 12,209,729 B2
(45) Date of Patent: Jan. 28, 2025

(54) LED LIGHT FIXTURES WITH WAVEGUIDE EDGE

(71) Applicant: CREE LIGHTING USA LLC, Racine, WI (US)

(72) Inventors: Randall Levy Bernard, Durham, NC (US); Kurt S. Wilcox, Libertyville, IL (US); Kurt Schreib, Wauwatosa, WI (US); Bin Hou, Schaumburg, IL (US); Jeremy Richard Sorenson, Oak Creek, WI (US); Anthony T. Schauf, Franksville, WI (US); Scott Fisher, Raleigh, NC (US)

(73) Assignee: CREE LIGHTING USA LLC, Racine, WI (US)

( * ) Notice: Subject to any disclaimer, the term of this patent is extended or adjusted under 35 U.S.C. 154(b) by 0 days.

(21) Appl. No.: 18/498,467

(22) Filed: Oct. 31, 2023

(65) Prior Publication Data

US 2024/0060610 A1 Feb. 22, 2024

Related U.S. Application Data

(63) Continuation of application No. 17/573,391, filed on Jan. 11, 2022, now Pat. No. 11,828,434, and a (Continued)

(51) Int. Cl.

| | |
|---|---|
| ***F21S 8/02*** | (2006.01) |
| ***F21V 5/04*** | (2006.01) |
| ***F21V 14/00*** | (2018.01) |

(Continued)

(52) U.S. Cl.

CPC .............. *F21S 8/026* (2013.01); *F21V 5/045* (2013.01); *F21V 14/006* (2013.01); *F21V 29/74* (2015.01); *F21Y 2115/10* (2016.08)

(58) Field of Classification Search

CPC .......... F21S 8/026; F21V 29/74; F21V 5/045; F21V 14/006

See application file for complete search history.

(56) References Cited

U.S. PATENT DOCUMENTS

| | | | | |
|---|---|---|---|---|
| 8,100,557 B2 * | 1/2012 | Chen | F21S 8/06 | 362/249.02 |
| 8,240,880 B2 * | 8/2012 | Chen | F21V 7/0058 | 362/243 |

(Continued)

OTHER PUBLICATIONS

EP Communication Rule 71(3) EPC, corresponding to application No. 20749994.8, 5 pages.

*Primary Examiner* — Bryon T Gyllstrom

(74) *Attorney, Agent, or Firm* — J. Clinton Wimbish; Maynard Nexsen PC

(57) ABSTRACT

An optic for a light-emitting diode (LED) array comprises an arrangement of optical structures for providing down lighting distribution from the LED array and a waveguide edge for providing up-lighting distribution from the LED array. Luminaires are described comprising an LED array and the optic. An overhead light fixture includes a driver assembly and a light-emitting assembly. The light-emitting assembly is operably connected to the driver and configured for downward emission of light from a light source of the light-emitting assembly. The light fixture is configured to be mounted to a canopy sheet of an overhead canopy, with the driver assembly disposed above the canopy sheet and the light-emitting assembly disposed below the canopy sheet. A bezel is optionally disposed around a lens of the light-emitting assembly, for aesthetic reasons and/or for controlling a degree of lateral emission of light from the light fixture.

19 Claims, 27 Drawing Sheets

Related U.S. Application Data continuation-in-part of application No. 17/388,520, filed on Jul. 29, 2021, now Pat. No. 11,555,586, said application No. 17/573,391 is a continuation-in-part of application No. 17/111,009, filed on Dec. 3, 2020, now Pat. No. 11,221,115, said application No. 17/388,520 is a continuation of application No. 16/891,962, filed on Jun. 3, 2020, now Pat. No. 11,085,599, said application No. 17/111,009 is a continuation of application No. 16/416,902, filed on May 20, 2019, now Pat. No. 10,935,196.

(60) Provisional application No. 62/857,805, filed on Jun. 5, 2019.

(51) Int. Cl.
*F21V 29/74* (2015.01)
*F21Y 115/10* (2016.01)

(56) References Cited

U.S. PATENT DOCUMENTS

| | | | | |
|---|---|---|---|---|
| 10,935,211 | B2 * | 3/2021 | Castillo | F21V 3/02 |
| 2001/0033432 | A1 * | 10/2001 | Clark | F21S 43/26 359/743 |
| 2006/0262544 | A1 | 11/2006 | Piepgras et al. | |
| 2008/0062685 | A1 * | 3/2008 | Belliveau | F21V 9/40 362/233 |
| 2010/0165599 | A1 * | 7/2010 | Allen | F21V 7/0025 362/84 |
| 2013/0272003 | A1 | 10/2013 | Miletich et al. | |
| 2014/0268829 | A1 | 9/2014 | Mandy et al. | |
| 2015/0003069 | A1 * | 1/2015 | Medendorp, Jr. | F21S 8/026 362/294 |
| 2020/0124272 | A1 * | 4/2020 | Spencer | H04R 1/025 |

* cited by examiner

LED LIGHT FIXTURES WITH WAVEGUIDE EDGE

RELATED APPLICATIONS

This application is a continuation of U.S. patent application Ser. No. 17/573,391, filed Jan. 11, 2022, which is a continuation-in-part of U.S. patent application Ser. No. 17/111,009, filed Dec. 3, 2020, now U.S. Pat. No. 11,221, 115, which is a continuation of U.S. patent application Ser. No. 16/416,902, filed May 20, 2019, now U.S. Pat. No. 10,935,196, the disclosures of which are incorporated herein by reference in their entireties.

This application is a continuation-in-part of U.S. patent application Ser. No. 17/388,520, filed Jul. 29, 2021, now U.S. Pat. No. 11,555,586, which is a continuation of U.S. patent application Ser. No. 16/891,962, filed Jun. 3, 2020, now U.S. Pat. No. 11,085,599, which claims the benefit of U.S. provisional patent application Ser. No. 62/857,805, filed Jun. 5, 2019, the disclosures of which are incorporated herein by reference in their entireties.

FIELD OF THE DISCLOSURE

The present disclosure relates generally to optical devices, and more specifically to luminaires employing waveguide optics to provide desired light distributions.

BACKGROUND

Canopy-mounted light fixtures ("fixtures") are often used to provide lighting in areas such as service stations, drive-through facilities such as banks, and other outdoor lighting environments which are generally lighted from above. Several varieties of canopy mounted light fixtures have been developed. For example, see the prior art fixtures disclosed in U.S. Pat. Nos. 9,169,983 and 9,182,096. Some of the canopy-mounted light fixtures of the prior art have part or substantially all of their structures located above, rather than below the generally horizontal planar structure which forms the "ceiling" of the canopy when in their use positions. Such planar structure will be referred to herein as the "canopy sheet." Above-sheet positioning of light fixtures is often deemed preferential from a design point of view because what appears overhead may be simply a rectangular or circular light emission area, rather than a bulky light fixture structure. However, such canopy mounted light fixtures may present difficulty related to initial positioning of the light fixtures and/or servicing. Indeed, when such light fixtures are positioned primarily above the canopy sheet, servicing may be particularly difficult and time-consuming when the parts to be serviced are located above the canopy sheet.

It would be desirable and economically advantageous to be able to easily service and replace functioning elements of the overhead light fixture, such as replacing or servicing light-emitting diode (LED) drivers, while retaining the portions of the light fixture in place above the canopy sheet. Some efforts have been directed toward this goal. For example, the light fixture described in the '983 patent allows removal of the driver tray assembly from below the canopy sheet for servicing. However, the light fixtures of the '983 patent may not be suitable for some situations, such as when a beam of the canopy support structure is located in close proximity to the desired mounting position.

As such, there remains a need for a low-cost and easily serviceable overhead canopy light fixtures, and related methods.

Traditional high bay luminaires used in retail stores typically use large source sizes, such as hundreds of mid-power LEDs, for various economic reasons, including the low cost of such sources. Optical control is needed to direct light emitted from these LEDs to desired locations. Additionally, up-lighting is desirable to illuminate portions of ceiling above the high bay luminaires in order to avoid a cave-like feeling. Elaborate glare reducing features are often included to mask un-shielded light from direct view by customers and employees. While traditional high bay luminaires utilize different design features to provide down lighting and up-lighting, they have largely reached their performance limits. Therefore, improvements in performance, visual comfort, and cost, as well as use of user serviceable components are needed.

SUMMARY

Embodiments of the present disclosure generally relate to an overhead light fixture, and related methods. In general, the light fixture includes a driver assembly and a light-emitting assembly. The driver assembly includes a driver and a housing. The light-emitting assembly is operably connected to the driver and configured for downward emission of light from a light source of the light-emitting assembly. The light-emitting assembly is detachably secured to the driver assembly. The light fixture is configured to be mounted to a canopy sheet of an overhead canopy, with the driver assembly disposed above the canopy sheet and the light-emitting assembly disposed below the canopy sheet. A bezel is optionally disposed around a lens of the light-emitting assembly, for aesthetic reasons and/or for controlling a degree of lateral emission of light from the light fixture.

In particular, one or more embodiments include an overhead light fixture for mounting to a canopy. The light fixture includes a driver assembly and a light-emitting assembly. The driver assembly includes a driver and a housing; with the housing having a base portion and a sleeve portion extending upwardly from the base portion at an angle less than vertical. The driver is detachably mounted in the sleeve portion. The light-emitting assembly is operably connected to the driver and configured for downward emission of light from a light source of the light-emitting assembly. The light-emitting assembly is detachably secured to the base portion of the driver assembly. The driver assembly is configured so that, when the light-emitting assembly is detached from base portion, the driver is removable downwardly through the base portion.

Other embodiments include an overhead light fixture for mounting to a canopy that includes a driver assembly, a light-emitting assembly, and a bezel. The driver assembly includes a driver and a housing. The housing has a base portion and a sleeve portion extending upwardly from the base portion. The driver is mounted in the sleeve portion. The light-emitting assembly is disposed below the driver assembly and detachably secured to the base portion of the driver assembly. The light-emitting assembly has a lens configured for downward and lateral emission of light from a light source of the light-emitting assembly. The bezel peripherally surrounds the lens and controls a degree of lateral emission of light from the light fixture. The driver assembly is configured so that, when the light-emitting assembly is detached from base portion, the driver is removable downwardly through the base portion.

One or more other embodiments include a method of servicing an overhead light fixture installed in an overhead canopy. The canopy has a canopy sheet and a fixture receiving opening therethrough. The overhead light fixture includes a driver assembly and a light-emitting assembly. The light-emitting assembly detachably secured to the canopy and configured for downward emission of light from a light source of the light-emitting assembly. The driver assembly includes a driver operatively connected to the light source. The driver assembly is disposed above the canopy and the light-emitting assembly is disposed below the canopy. The method includes dismounting the light-emitting assembly from the canopy; thereafter, removing the driver from below the canopy by moving the driver downward out the fixture-receiving opening; while the driver is removed, servicing or replacing the driver with a replacement driver; installing the serviced or replacement driver by moving the serviced or replacement driver upward through the fixture-receiving opening; and remounting the light-emitting assembly to the canopy and operatively connecting the light-emitting assembly to the serviced or replacement driver.

In one aspect, optics for use with light-emitting diode (LED) arrays are described herein. An optic, for example, comprises an arrangement of optical structures for providing one or more down lighting distributions from the LED array, and a waveguide edge for providing one or more up-lighting distributions from the LED array. The optic can be a single piece or can comprise two or more pieces. In some embodiments, the optical structures are Fresnel structures, and in other embodiments, single optical structures are positioned over each LED in the LED array. The optical structures can in some cases be micro-scale optical structures ("micro-optical structures"). The arrangement of optical structures can optionally be a radial arrangement. In some cases, the arrangement of optical structures comprises concentric rings. The optical structures can be uniform over the arrangement, or, in other instances, can vary over the arrangement. In some embodiments, the arrangement of optical structures provides a symmetric down lighting distribution. Alternatively, the arrangement of optical structures provides an asymmetric down lighting distribution. The one or more up-lighting distributions provided by the waveguide edge can be symmetric or asymmetric. In some instances when the optic comprises two or more pieces, each piece can independently have a waveguide edge that provides an up-lighting distribution that is symmetric or asymmetric. Additionally, in some embodiments, a waveguide edge described herein can receive 5 percent to 20 percent of total light produced by the LED array.

In another aspect, luminaire architectures are described herein. In some embodiments, a luminaire comprises an LED array, and an optic covering the LED array, the optic comprising an arrangement of optical structures for providing one or more down lighting distributions form the LED array, and a waveguide edge for providing one or more up-lighting distributions from the LED array. As described herein, the arrangement of optical structures can provide a symmetric or asymmetric down lighting distribution. In some cases, the one or more up-lighting distributions provided by the waveguide edge are of a different color than the one or more down lighting distributions provided by the optical structures. The up-lighting and down lighting distributions can be selected independently from one another. The optical structures can be Fresnel structures, or single optical structures position over each LED in the LED array. In some cases, the optical structures are micro-scale optical structures. Moreover, a ratio of max luminance at 65 degrees from nadir to total lumen output from the luminaire can be less than 7, in some cases. Additionally, luminance at 65 degrees from nadir is less than $3\times10^5$ cd/m$^2$, in some embodiments. Luminaires described herein can further comprise one or more of a glare shield, a driver assembly, and/or an LED heatsink. The LED heatsink can optionally comprise a plurality of vents positioned proximate the driver assembly.

In another aspect, luminaires described herein comprise a LED array, and an optic covering the LED array, the optic comprising an arrangement of optical structures providing a ratio of max luminance at 65 degrees from nadir to total lumen output from the luminaire of less than 7. The optical structures can be micro-scale optical structures in some cases. In some embodiments, the optical structures have a radial arrangement. The optic can further comprise one or more structures providing one or more up-lighting distributions, and in some cases, the one or more structures is a waveguide edge. The luminaire can further comprise one or more of a glare shield, a driver assembly, and/or an LED heatsink having a plurality of vents proximate the driver assembly.

In a further aspect, lighting systems are provided. In one embodiment, a lighting system comprises a plurality of luminaires having architecture and/or lighting properties described herein arranged over an area enclosed by walls. In some embodiments, each luminaire has a structure previously described herein. In some cases, the optic of the luminaire comprises an arrangement of optical structures for providing one or more down lighting distributions form the LED array, and a waveguide edge for providing one or more up-lighting distributions from the LED array. Optics of luminaires adjacent to the walls can differ from the optics of luminaires over a central region of the area. The optic of luminaires adjacent to the walls, for example, can provide an asymmetric down lighting distribution, and the optic of luminaires over the central region can provides a symmetric down lighting distribution.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWING FIGURES

DETAILED DESCRIPTION

Figure 1:
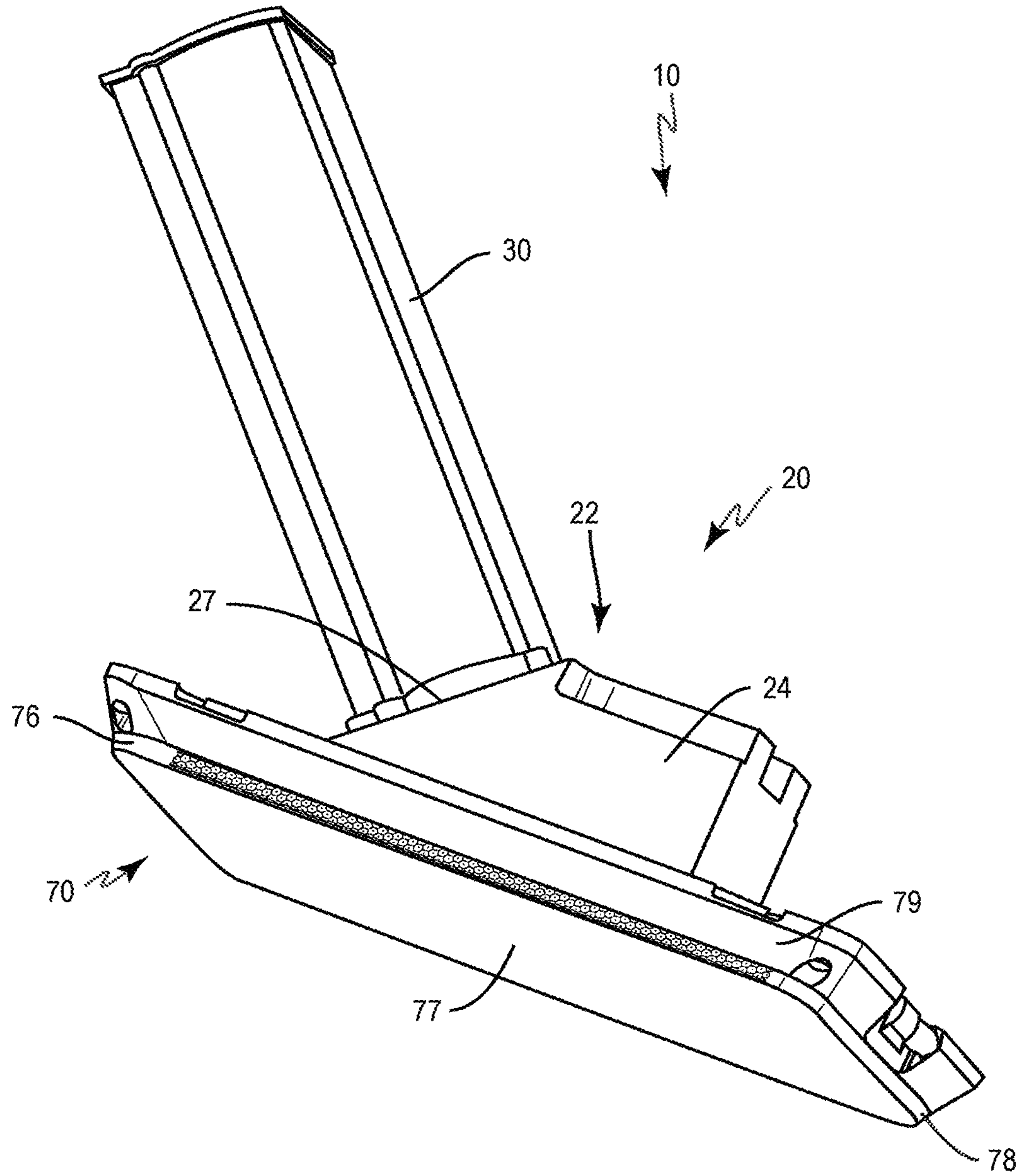
FIG. 1 is a perspective view of a light fixture according to one or more embodiments.
Figure 2:
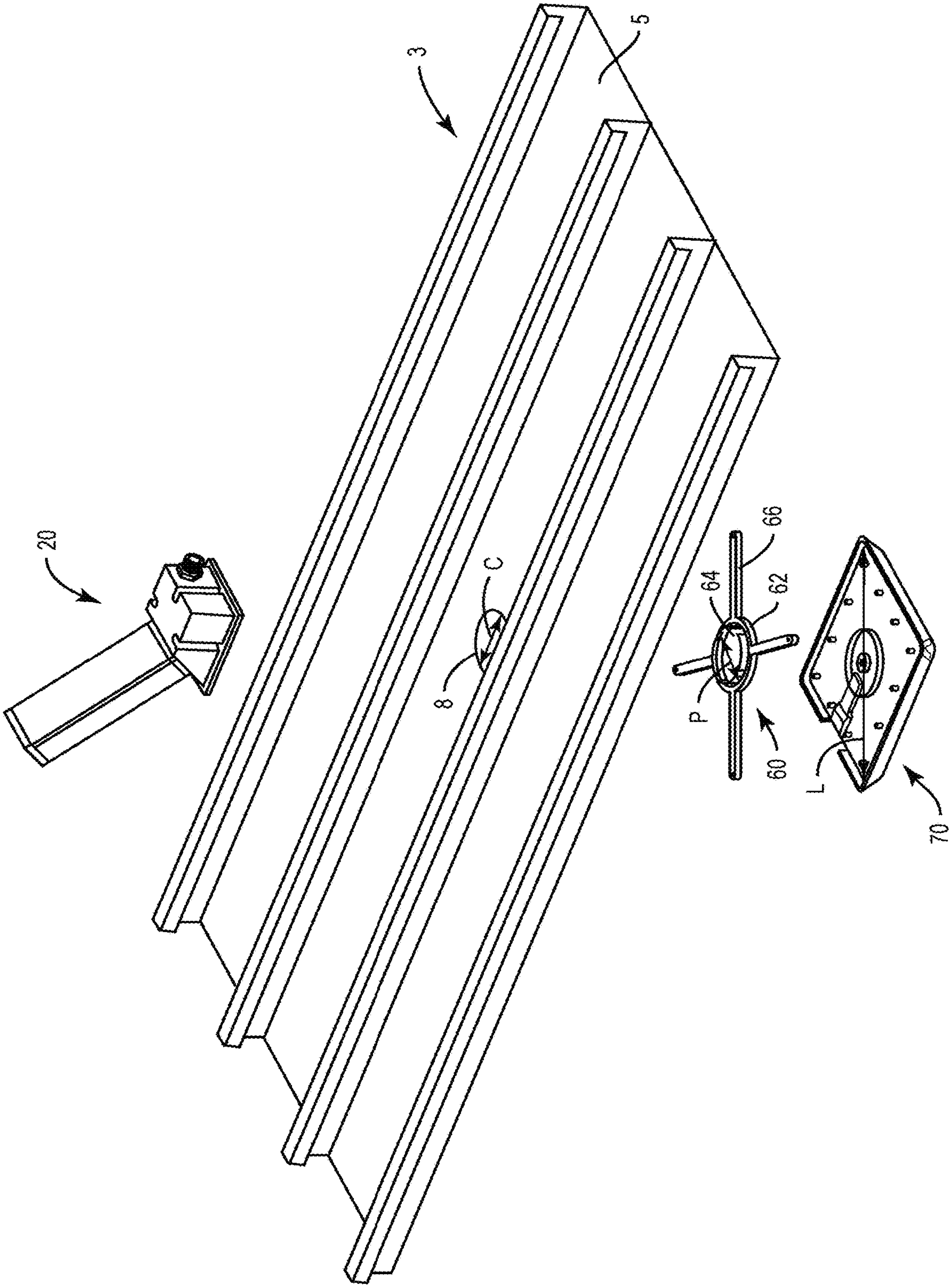
FIG. 2 shows a partially exploded view of a light fixture and an associated canopy.
Figure 3:
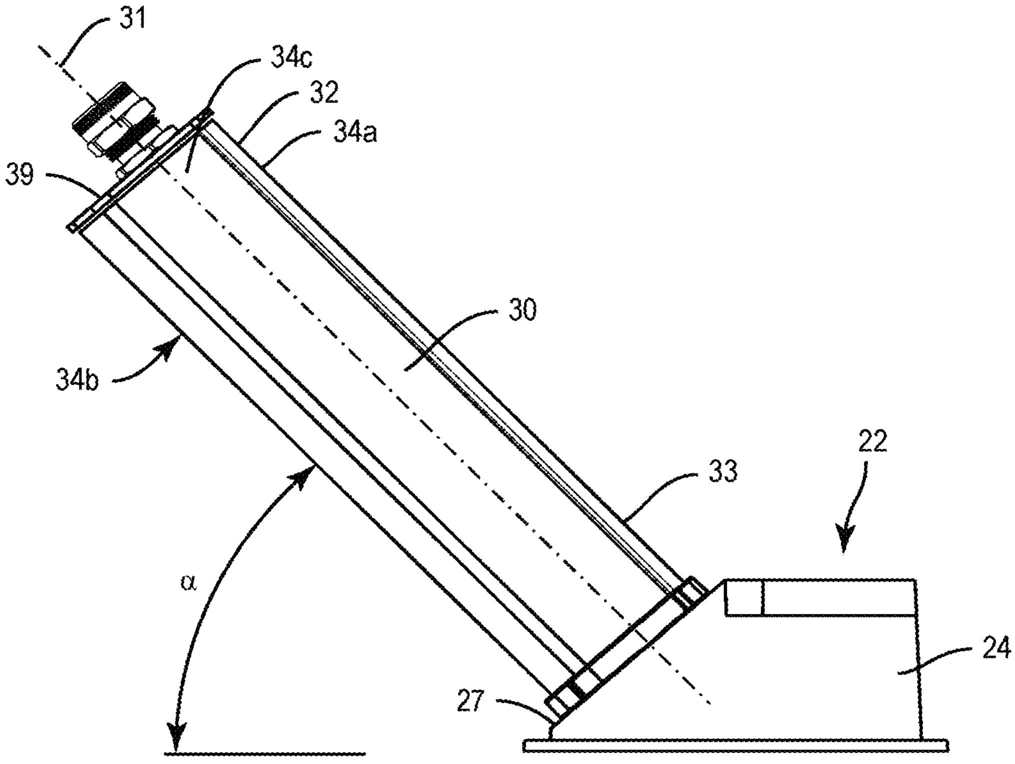
FIG. 3 shows a side view of a driver assembly.
Figure 4:
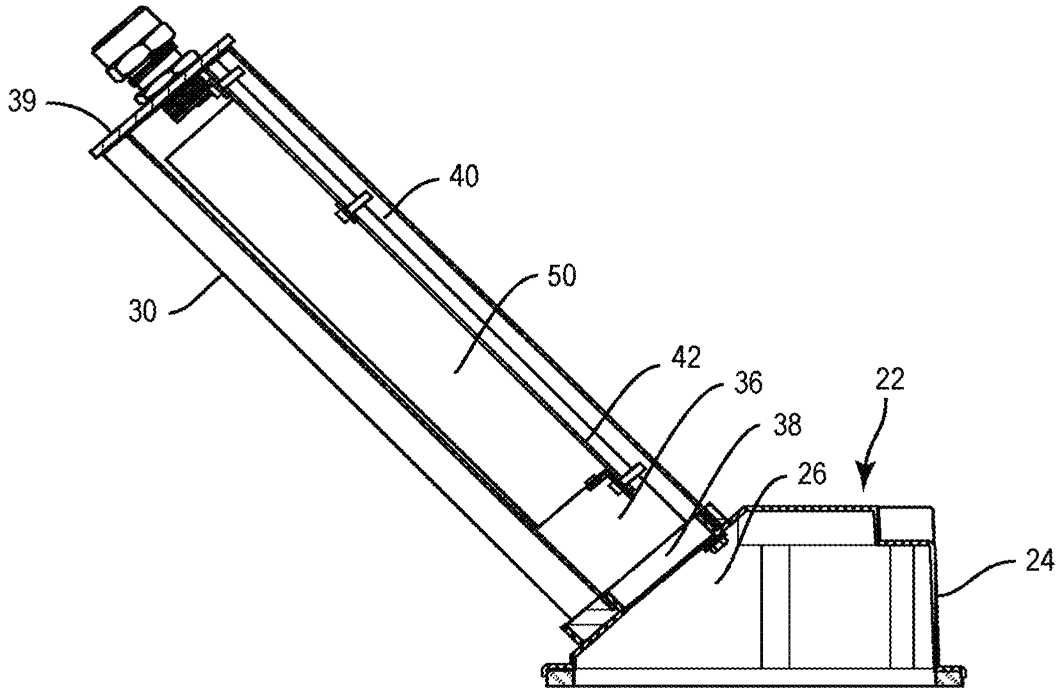
FIG. 4 shows a cross-sectional view of the driver assembly of FIG. 3.
Figure 5:
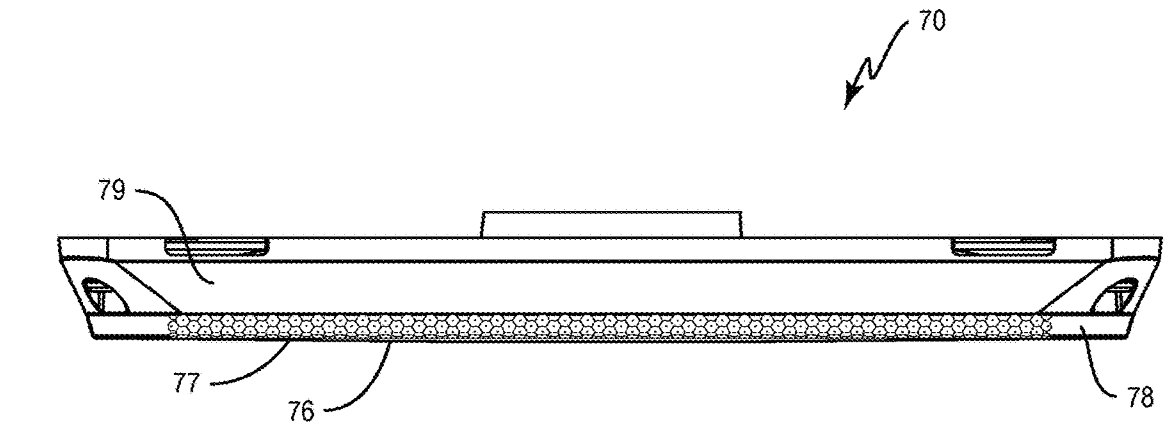
FIG. 5 shows a side view of a light-emitting assembly.
Figure 6:
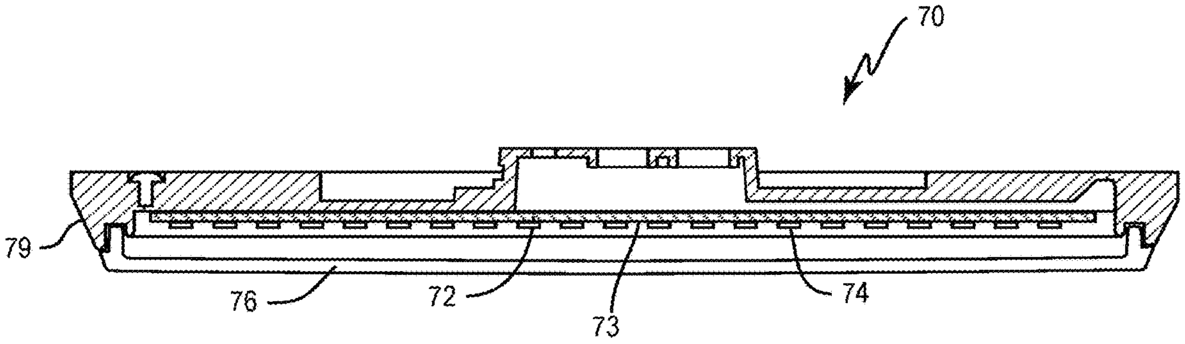
FIG. 6 shows a cross-sectional view of the light-emitting assembly of FIG. 5.
Figure 7:
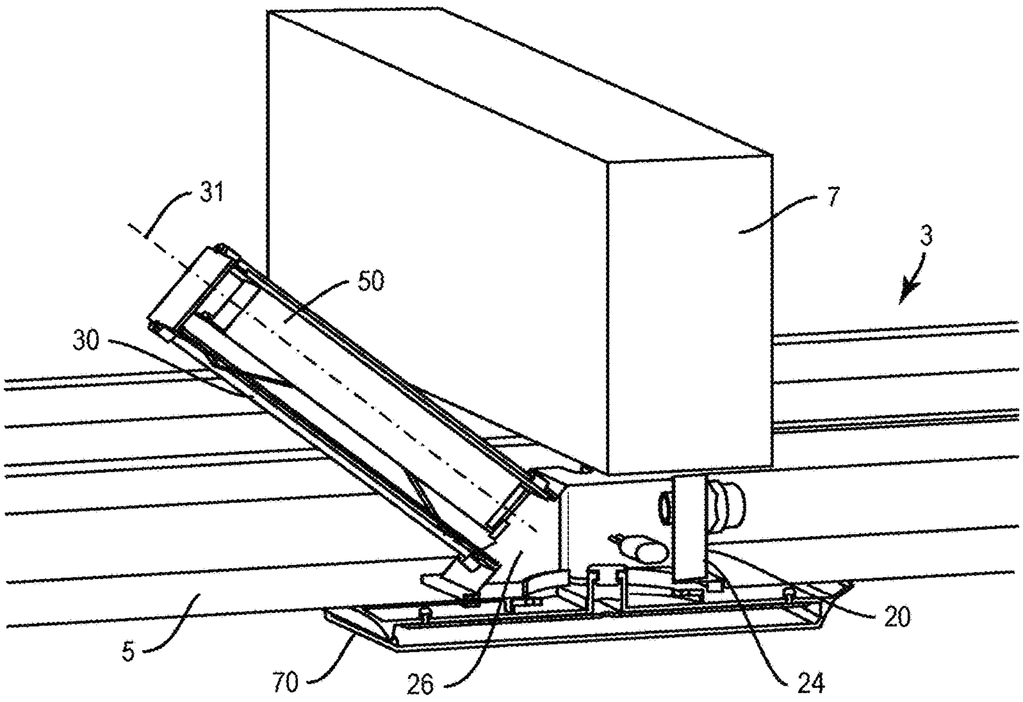
FIG. 7 shows a cross-sectional view of a light fixture installed on a canopy.
Figure 8:
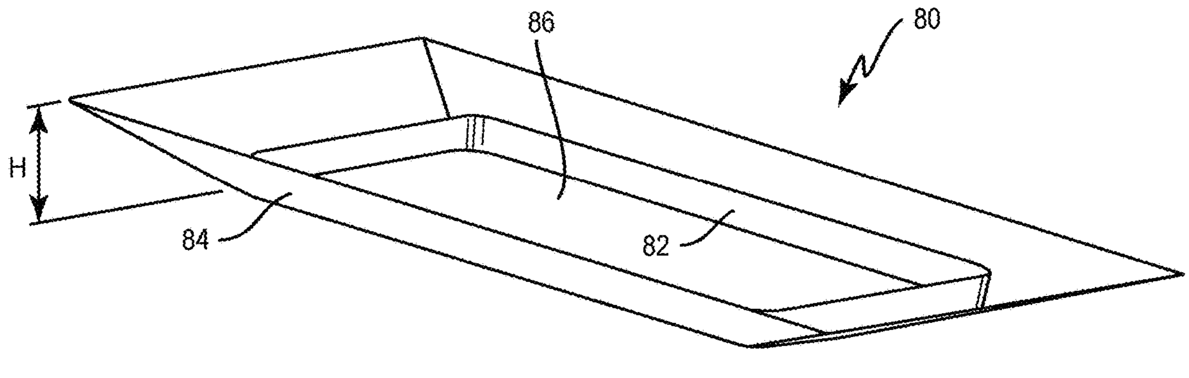
FIG. 8 shows a perspective view of a bezel.
Figure 9:
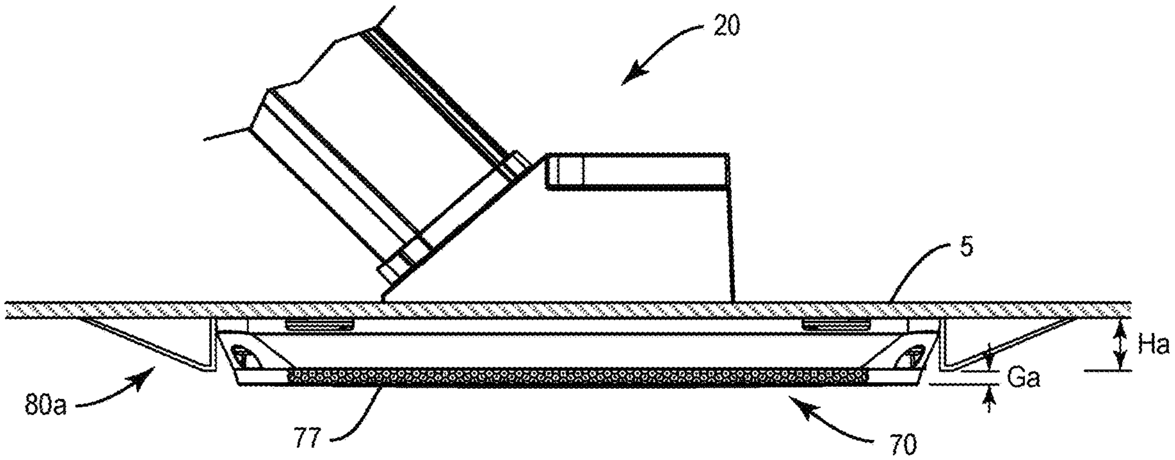
FIG. 9 shows a cross-sectional side view of a bezel disposed around a light-emitting assembly.
Figure 10:
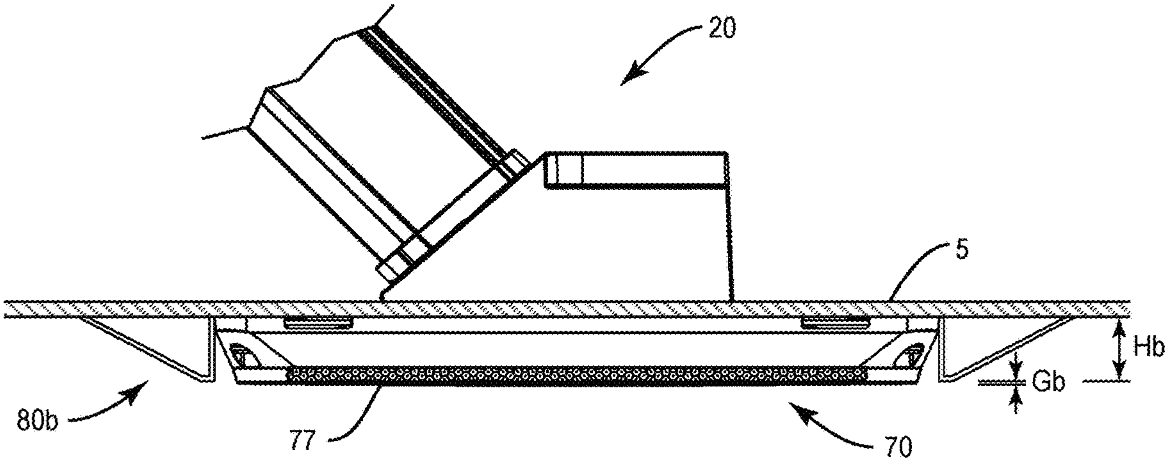
FIG. 10 shows a cross-sectional side view of another bezel disposed around a light-emitting assembly.
Figure 11:
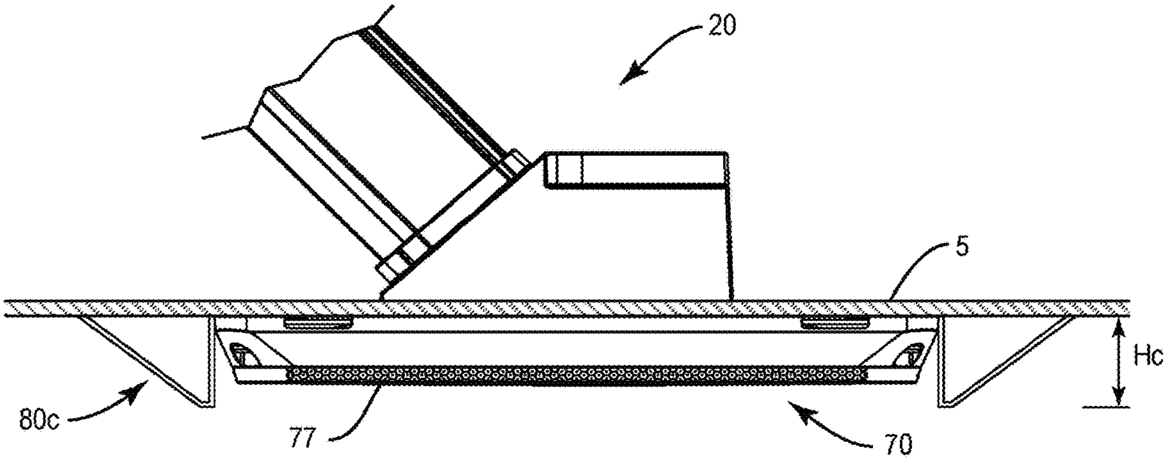
FIG. 11 shows a cross-sectional side view of another taller bezel disposed around a light-emitting assembly.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure, and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art, and will not be interpreted in an idealized or overly formal sense unless expressly so defined herein.

In one or more aspects, the present disclosure is directed to an overhead light fixture 10 for mounting to a canopy 3. As shown in FIGS. 1-11 and 17-23, the overhead light fixture 10 (or simply "light fixture") includes a driver assembly 20 and a light-emitting assembly 70. The driver assembly 20 mounts above the canopy sheet 5, and includes a housing 22 and a driver 50 detachably secured in the housing 22. The housing 22 includes a base portion 24 and a sleeve portion 30 that projects upwardly away from the base portion 24. In some aspects, the base portion 24 is advantageously generally block-like so as to form an internal cavity 26, with a sloped outer face 27 facing the sleeve portion 30. The sleeve portion 30 advantageously takes the form of a generally tubular structure, with any suitable internal cross section (which may be constant and/or varying). Thus, sleeve portion 30 typically has an upper wall 34*a*, a lower wall 34*b*, and sidewalls 34*c* disposed about an internal passage 36. The internal passage 36 is intended to receive the driver 50. Note that the sloped outer face 27 of the base portion 24 includes an opening that is aligned with the internal passage 36 of the sleeve portion 30, so that internal passage 36 opens into the internal cavity 26 of the base portion 24. The sleeve portion 30 has an upper end 32 and a lower end 33, with the lower end 33 being disposed closer to the base portion 24. The upper end 32 of the sleeve portion 30 is optionally closed by cover plate 39. The sleeve portion 30 may be any suitable shape, such as linear, curved, angled, and any mix thereof. The sleeve portion 30 shown in FIGS. 1-4, 7, 9-11, 20, and 22-23 is linear and extends along a sleeve axis 31. Note that sleeve axis 31 is angled from vertical, at an angle relative to horizontal referred to as projection angle α. Projection angle α can be 0° (so sleeve portion 30 is horizontal) to anywhere less than 90°. The projection angle α is advantageously in the range of about 30° to about 60°, and more advantageously about 45°. Suitable gaskets 38 are optionally advantageously employed to help seal the various components of the housing 22, and optionally advantageously between the base portion 24 and the upper face of the canopy sheet 5.

The driver 50 is suitable for driving the light source and is operatively connected thereto. Details of the driver 50 are not important for understanding the concepts herein, and are omitted for clarity. In some aspects, the driver 50 is detachably secured directly to the sleeve portion 30. However, in other aspects, the driver 50 is detachably secured indirectly to the sleeve portion 30. For example, the driver 50 may form a portion of a tray assembly 40 that is detachably secured to sleeve portion 30. The tray assembly 40 includes a driver tray 42 and the driver 50. The driver tray 42 is configured to be slidably received in the internal passage 36 of the sleeve portion 30. Note that in some aspects, the driver 50 is mounted on the top side of the driver tray 42 when installed, so that the driver 50 is disposed above the driver tray 42 when secured in the sleeve portion 30, and in some aspects the driver 50 is mounted on the underside of the driver tray 42 when installed, so that the driver 50 is disposed below the driver tray 42 when secured in the sleeve portion 30. In order to facilitate the sliding appropriately, the driver tray 42 and/or the interior faces of the sleeve portion 30 optionally include suitable features, such as guide rails and/or inter-engaging guides, that help keep the driver tray 42 properly positioned and oriented relative to the sleeve portion 30 during the sliding of the driver tray 42 into and/or out of the sleeve portion 30. Optionally also connected to the driver tray 42 is a surge circuit and/or a dimming circuit. The driver 50, and optionally the surge circuit and/or the dimming circuit, are detachably secured to the driver tray 42 by any suitable means, such as screws, clips, mounting brackets, adhesive, and the like. In some aspects, the sleeve portion 30 and the driver tray 42 are optionally configured so that the driver 50 abuts against the inner face of a wall (such as upper wall 34*a* or lower wall 34*b*) of the sleeve portion 30. This abutment allows for better heat transfer away from the driver 50 via the sleeve portion 30.

The light-emitting assembly 70 includes a light source 72, a lens 76, and an engine housing 79. The light source 72 may take any suitable form known in the art, but typically includes a generally planar circuit board 73 with a plurality of LEDs 74 mounted thereon. The LEDs 74 are arranged in an array, which may be regular or irregular in arrangement. The light source 72 mounts to the engine housing 79. The engine housing 79 is designed to be mounted directly and/or indirectly to the canopy sheet 5 from below. The engine housing 79 provides a means to support and position the light-emitting assembly 70. The lens 76 is disposed below the light source 72, is supported by the engine housing in alignment with the light source 72, and includes an exposed lower face 77 that forms the lower face of the light emitting assembly 70, and side face(s) 78 that are optionally at least partially exposed. The lens 76 may include optical features to direct and/or shape the light emitted by the light-emitting assembly 70. The majority of the light emitted by the light-emitting assembly 70 is directed downward. However, some light may be emitted laterally, such as out the side face(s) 78 of the lens 76. For ease of reference, light emitted from a light source 72 at angles of 60° or more relative to the average light emission direction of the light source 72 may be referred to as "sparkle light". The light-emitting assembly 70, and thus the light source 72, lens 76, and engine housing 79 can be any suitable shape in plan view, such as round, oval, rectangular (including square), hexagonal, etc., including combinations thereof and irregular shapes. The light-emitting assembly 70 shown in FIGS. 1-2, 5-7, 9-11, 19, and 22-23 is generally rectangular for illustrative purposes only. The light-emitting assembly 70 has a size L corresponding to its largest orthogonal dimension.

Figure 12:
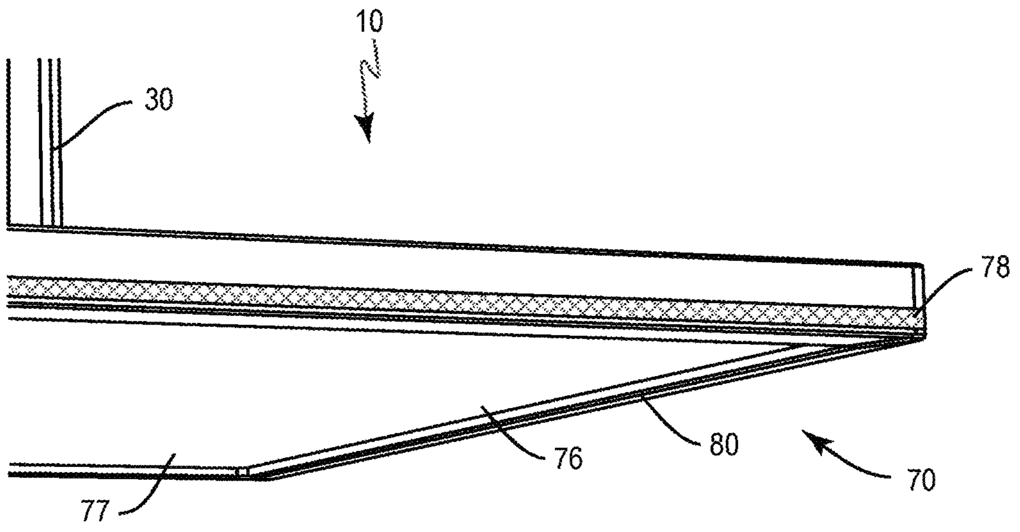
FIG. 12 shows an example light fixture utilizing light from an array of light-emitting diode (LEDs) and directing some of the light out along the lens.

FIG. 12 shows an example light fixture 10 utilizing light from an array of LEDs 74 and directing some of the light out along the lens to generate the "sparkle effect" without increasing the depth of the fixture. The "sparkle" feature may be controlled independently from a light source on a main portion of the fixture.

Figure 13:
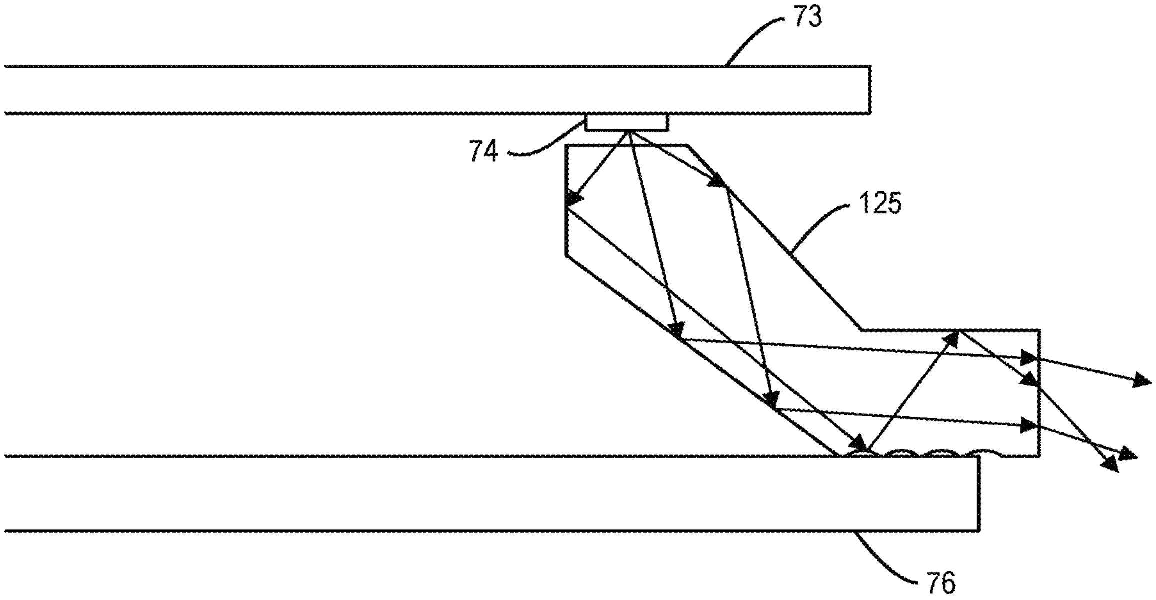
FIG. 13 illustrates an example cross-sectional view of the light fixture utilizing a waveguide edge configured for directing light through an edge of the light fixture.

FIG. 13 illustrates an example cross-sectional view of the light fixture 10 utilizing a waveguide edge 125 configured for directing light through an edge of the light fixture 10. In addition or as an alternative, light may have different color components. In some embodiments, light from one or more LEDs 74 can propagate through a waveguide edge 125 and exit the side face 78.

Figure 15:
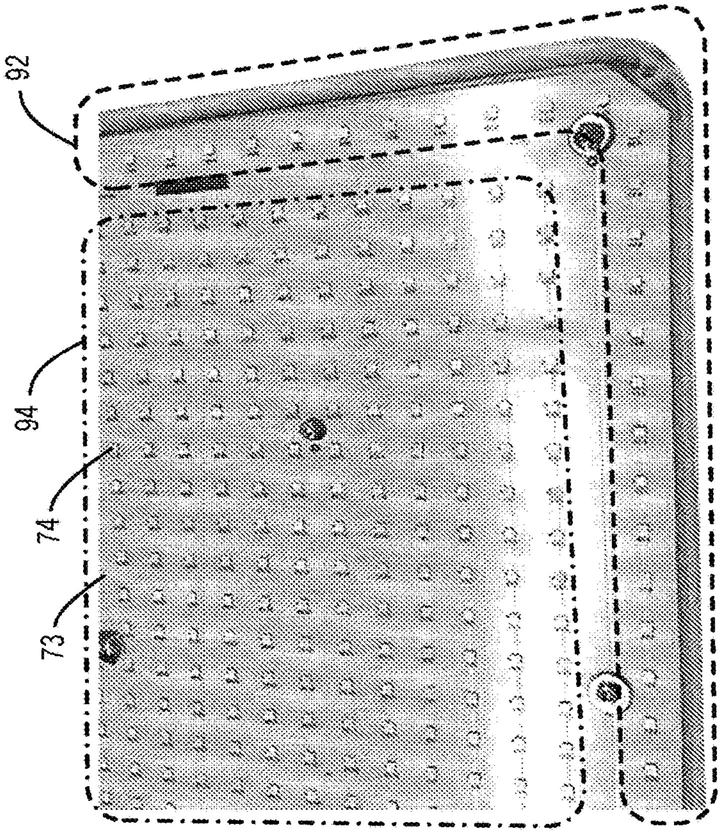
FIG. 15 is an expanded view of the circuit board of FIG. 14.
Figure 14:
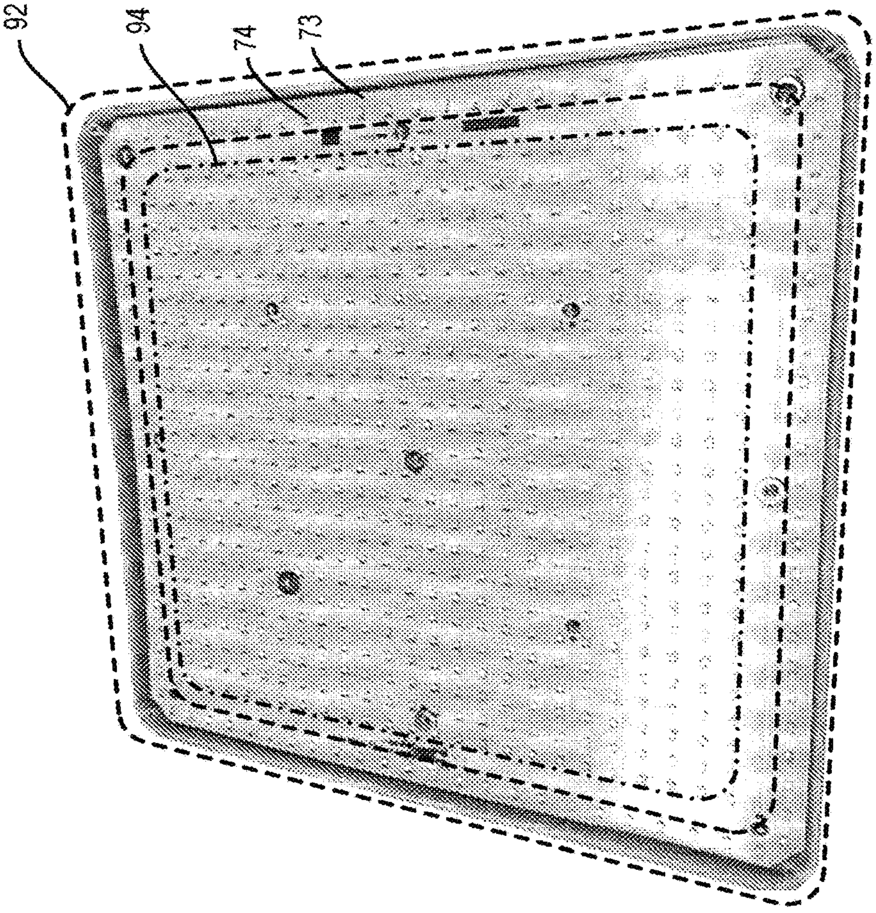
FIG. 14 illustrates an example of a circuit board with LEDs positioned in two regions.

FIGS. 14 and 15 illustrate an example of a circuit board 73 with LEDs 74 positioned in two regions. For example, a perimetrical region 92 may be formed by at least one row of LEDs 74 extending along a perimeter of the circuit board 73. The perimetrical region 92 may be controlled separately from a middle region 94, which may occupy a major middle area of the light fixture 10 and be a main-portion light source. While the middle region 94 may be focused downward, the perimetrical region 92 may be controlled to provide the "sparkle" effect, as illustrated in FIGS. 12 and 13. In some cases, both light regions 92, 94 are turned on and emit light. In other cases, the middle region 94 can be turned off with only the perimetrical region 92 emitting light. In still other cases, only the middle region 94 emits light and the perimetrical region 92 is turned off.

The light fixture 10 may permit light being turned off and on during certain hours. In some embodiments, light may be turned on only along some sides of the light fixture 10 in order to minimize light in undesired direction(s), such as minimizing objectionable stray light towards residential neighbors. The light could also be blocked with mechanical shields that could snap on the luminaire.

As discussed above, the canopy 3 includes a canopy sheet 5, which is advantageously disposed horizontally. The canopy sheet 5 is most typically sheet metal, but may be of other materials. The canopy sheet 5 includes a canopy opening (sometimes referred to as a fixture-receiving opening) 8 that corresponds to the light fixture 10. The canopy opening 8 is typically round, but may take any suitable shape. In plan view, the canopy opening 8 has a size C that is smaller than the size L of the light-emitting assembly 70, and is smaller than the base portion 24 of the driver assembly 20. Note that when installed, the driver assembly 20 is disposed above the canopy sheet 5 and the light-emitting assembly 70 is disposed below the canopy sheet 5. The base portion 24 of the driver assembly 20 is typically mounted to the upper side of the canopy sheet 5, centered above the canopy opening 8, with the sleeve axis 31 advantageously intersecting the center of the canopy opening 8. The light-emitting assembly 70 is mounted to the underside of canopy sheet 5, and is also advantageously centered relative to the canopy opening 8. The electrical/control interconnections between the driver 50 and the light-emitting assembly 70 flow through the canopy opening 8.

In some aspects, the light fixture 10 also includes a mounting bracket 60 that is disposed between the light-emitting assembly 70 and the driver assembly 20. The mounting bracket 60 is configured to mount to the underside of the canopy sheet 5, and provides some additional rigidity to the resulting structure, as well as providing a common mounting element. The light-emitting assembly 70 may be detachably mounted to the canopy 3 via the mounting bracket 60, with the light-emitting assembly 70 mounting directly to the mounting bracket 60, and the mounting bracket 60 mounting directly to the canopy sheet 5 (or optionally via a suitable gasket). Likewise, the driver assembly 20 may be mounted to the canopy sheet 5 from above, and secured to the mounting bracket 60 through the canopy sheet 5. The mounting bracket 60 has a pass-through opening 64 that is intended to be aligned with the canopy opening 8. The pass-through opening 64 has a size P, and is advantageously similarly shaped as the canopy opening 8. The size P is smaller than the size of the light-emitting assembly 70, and is advantageously less than 50% of size of the light-emitting assembly 70, and more advantageously not more than 30% of size of the light-emitting assembly 70. The mounting bracket 60 may take any suitable form, such as a simple plate with holes. However, the mounting bracket 60 advantageously includes a central region 62 with a plurality of arms 66 extending outward therefrom. There may be any suitable number of arms 66, such as three, four, five, etc. The pass-through opening 64 is located in the central region 62. In some aspects, the light fixture 10 does not include a mounting bracket 60, and/or only one of the driver assembly 20 and the light-emitting assembly 70 mount to the canopy sheet 5 via the mounting bracket 60.

In some aspects, the light fixture 10 may optionally include a bezel 80 disposed peripherally about the light-emitting assembly 70, for improved appearance and/or protection and/or functioning. When installed, the optional bezel 80 peripherally surrounds the lens 76 in plan view (from below). The bezel 80 includes an inner face 82 and an outer face 84, and defines a central opening 86. The outer face 84 is typically sloped, so that, when installed, the outboard portions of bezel 80 slope toward the canopy 3. The inner face 82 bounds central opening 86. The inner face 82 may be vertical (relative to lower face 77 of lens 76), or may be sloped, as is desired. The central opening 86 is configured to receive the light-emitting assembly 70, in particular the lens 76. When viewed in cross-section, the bezel 80 has a height H. As discussed further below, bezels of differing heights may be employed to achieve different visual effects. In certain embodiments, an opaque bezel 80 may be used to block any side illumination. In certain embodiments, a diffusing bezel 80 provides the "sparkle" effect. Note that in some aspects, light fixture 10 does not include the bezel 80.

The light fixture 10 is initially installed on the canopy 3 by accessing the canopy 3 from above and from below the canopy sheet 5. The following discussion will assume a mounting bracket 60 is employed, but such is not required. A suitable canopy opening 8 is formed if not already present. See FIG. 17. Typically, the canopy opening 8 is formed from below, and the canopy hole 8 (when round) is advantageously not more than four inches in diameter, so that size C is four inches or less. The mounting bracket 60 is mounted to the underside of the canopy sheet 5 via screws or the like. See FIG. 18. From below, the light-emitting assembly 70 is secured to canopy 3 by being mounted to the mounting bracket 60. See FIG. 19. From above, the driver assembly 20 is mounted to the upper side of the canopy sheet 5 by being secured to the mounting bracket 60. See FIG. 20. The base portion 24 of the driver assembly 20 overlaps the light-emitting assembly 70 and is aligned with the canopy opening 8, so that the canopy opening 8 aligns with the internal cavity 26 of the base portion 24, advantageously such that the sleeve axis 31 extends through the canopy opening 8. The driver 50 may be present in the shell housing, or may be installed later, such as by being slid into position in the sleeve portion 30 by being inserted through the pass-through opening 64 and the canopy opening 8 into the internal passage 36 of the sleeve portion 30, and properly secured. Appropriate electrical connections are made, e.g., supply power is connected to the driver assembly 20, and the driver 50 operatively connected to the light-emitting assembly 70. Caulk or other sealing materials are then applied as needed to seal around any openings the canopy 3 appropriately. Note that the driver assembly 20 and the light-emitting assembly 70 are disposed on opposing sides of the canopy 3 and the mounting bracket 60.

From the discussion above, it can be seen that the light fixture 10, in some aspects, includes a driver assembly 20 and a light-emitting assembly 70. The driver assembly 20 includes a driver 50 and a housing 22; with the housing 22 having a base portion 24 and a sleeve portion 30 extending upwardly from the base portion 24 at an angle α less than vertical. The driver 50 is detachably mounted in the sleeve portion 30. The light-emitting assembly 70 is operably connected to the driver 50 and configured for downward emission of light from a light source 72 of the light-emitting assembly 70. The light-emitting assembly 70 is detachably secured to the base portion 24 of the driver assembly 20. The driver assembly 20 is configured so that, when the light-emitting assembly 70 is detached from base portion 24, the driver 50 is removable downwardly through the base portion 24.

It should be noted that the angled orientation of the driver 50 provides flexibility during installation. For example, when a beam 7 of the canopy 3 is located so as to overlap the canopy opening 8, a vertical orientation of the driver 50 may not be possible due to interference by the beam 7. However, disposing the driver 50 as described above (e.g., in a sleeve portion 30 at a non-vertical angle α), allows the driver assembly 20 to be partially overlapped by the beam 7, but the driver 50 to be positioned away from the beam 7, so that no interference is created. This allows greater flexibility in locating the canopy opening 8 and corresponding light fixtures 10.

In addition, in some aspects, the driver assembly 20 is configured so that it can be secured to the light-emitting assembly 70 in a plurality of orientations relative to the light-emitting assembly 70. For example, the driver assembly 20 may be configured so that it can mount to the mounting bracket 60 (and/or canopy sheet 5) in any one of a plurality of relative rotational orientations relative to the light-emitting assembly 70. For example, assume that the driver assembly 20 can be secured to the mounting bracket 60 in any one of four different rotational orientations so that the sleeve portion 30 can extend in any one of four conceptual directions. With such a design, the sleeve portion 30 of the driver assembly 20 may be oriented in one direction (e.g., "east"), when an orientation of a different direction (e.g., "west") would create interference and/or have less desirable access. Note that selection of the orientation for driver assembly 20 (relative to the canopy 3) does not mandate a particular orientation of the corresponding light-emitting assembly 70, due to the allowed variability in relative rotational orientations for such a design. Of course, any number of relative positions are envisioned, but four is believed suitable for most situations. Allowing flexibility in installation orientation for the driver assembly 20, without impacting the orientation of the light-emitting assembly 70 relative to the canopy 3, allows for easier and more reliable installation.

The light-emitting assembly 70 is configured for downward emission of light from a light source 72 of the light-emitting assembly 70 when installed. Light may also be emitted laterally downward, but at an (non-zero) angle to vertical. Such lateral light emissions may be undesirable in some situations, and desirable in other situations. In some aspects, the degree of lateral emission of light coming from light fixture 10 may be controlled by an optional associated bezel 80.

In one approach, bezels 80 of different heights may be offered, such as a first bezel 80*a* and a second bezel 80*b*. Both the first bezel 80*a* and the second bezel 80*b* are as described above, but are of differing heights. Thus, both the first bezel 80*a* and the second bezel 80*a* are configured to be disposed around the lens 76 of the light-emitting assembly 70 (as alternatives, not simultaneously). For purposes of discussion, assume that the height Ha of the first bezel 80*a* less than the height Hb of the second bezel 80*b*; that is, the second bezel 80*b* is taller. The height Ha of the first bezel 80*a* is less than the light-emitting assembly 70, so that, in side view, the first bezel 80*a* forms a first vertical gap Ga with the lower face 77 of the lens 76 when disposed around the lens 76. The height Hb of the second bezel 80*b* is more than the height Ha of the first bezel 80*a*, so, in side view, the second bezel 80*b* forms a second vertical gap Gb with the lower face 77 of the lens 76 when disposed around the lens 76. In some aspects, the second bezel 80*b* is flush with the lower face 77, so the second vertical gap is not present. Due to their differing heights, the first bezel 80*a* will block a first portion of the lateral light emitted from the lens 76 when it is disposed around the lens 76, while the second bezel 80*b* will block a second portion of the lateral light emitted from the light-emitting assembly 70 when it is disposed around the lens 76, with the second portion being greater than the first portion. The heights H of the bezels 80*a*, 80*b* may be such that the lens 76 appears to protrude from the bezel 80 when the first bezel 80*a* is used (see FIG. 9), and is either less protruding (see FIG. 10) or flush mounted when the second bezel 80*b* is used. This example can be extended to three or more bezels 80 of different heights. In addition, the second bezel 80*b* (or third, etc.) may have sufficient height H so as block substantially all of the laterally emitted light, such as by being flush or by having a height H such that it extends below the lower surface 77 and thereby making the lens fully recessed relative to the bezel 80. For example, a third bezel 80*c* may be used that has a height Hc that is more than the height Hb of the second bezel 80*b*, such that the lens 76 is fully recessed with respect to the bezel 80*c* (see FIG. 11).

In some aspects, bezels 80 of the same height H but different optical properties may be offered. For example, a first bezel 80 may pass a first portion of lateral light from the lens 76 with a first attenuation, while a second bezel 80 may pass a second portion of lateral light from the lens 76 with a second, higher, attenuation. The difference in attenuation may be achieved with a difference in materials, a difference in material thickness or density, and/or a difference in color. Of course, the approaches of varying height and varying attenuation may be combined as well.

From the discussion above, it can be seen that the light fixture 10, in some aspects, includes a driver assembly 20, a light-emitting assembly 70, and a bezel 80. The driver assembly 20 includes a driver 50 and a housing 22, with the housing 22 having a base portion 24 and a sleeve portion 30 extending upwardly from the base portion 24. The driver 50 is mounted, optionally detachably mounted, in the sleeve portion 30. The light-emitting assembly 70 is disposed below the driver assembly 20 and detachably secured to the base portion 24 of the driver assembly 20. The light-emitting assembly 70 has a lens 76 configured for downward and lateral emission of light from light source 72 of the light-emitting assembly 70. The bezel 80 peripherally surrounds the lens 76 and controls a degree of lateral emission of light from the light fixture 10. The driver assembly 20 is configured so that, when the light-emitting assembly 70 is detached from base portion 24, the driver 50 is removable downwardly through the base portion 24.

In some aspects, the bezel 80 is either a first bezel 80*a* or a second bezel 80*b*. The first bezel 80*a* is configured to be disposed around the lens 76 and block a first portion of light laterally emitted from the lens 76 when disposed around the lens 76. The second bezel 80*b* is configured to be disposed around the lens 76 and block a second portion of light laterally emitted from the lens 76 when disposed around the lens 76; wherein the second portion is greater than the first portion. In some aspects, the first bezel 80 has a smaller height Ha than a height Hb of the second bezel 80.

Figure 16:
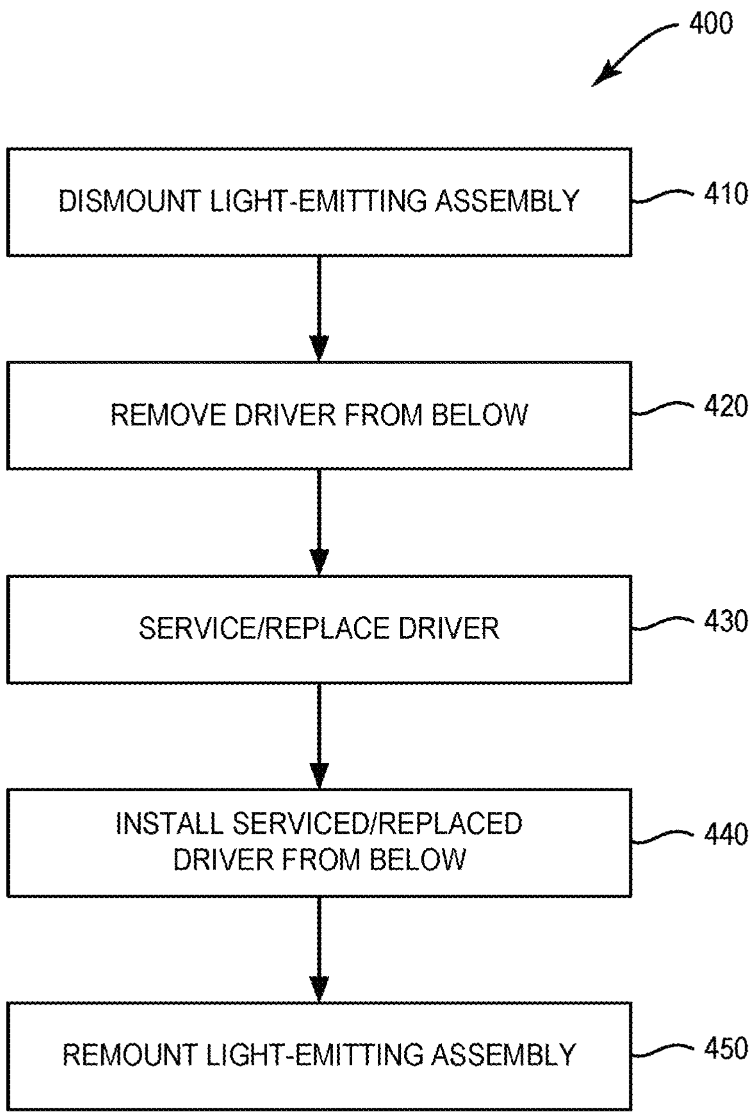
FIG. 16 shows a simplified process flow chart for a method of servicing an overhead light fixture installed in an overhead canopy.
Figure 17:
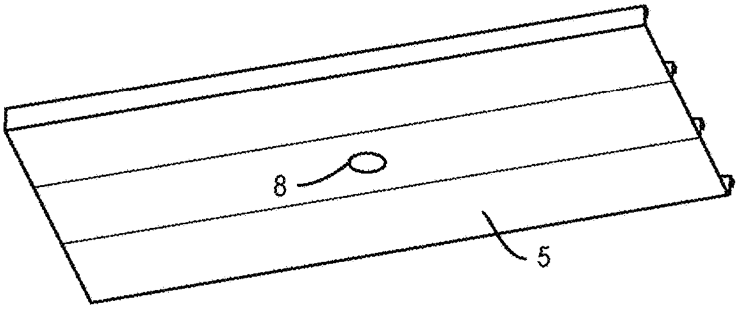
FIG. 17 shows a lower perspective view of a canopy with a canopy opening.
Figure 18:
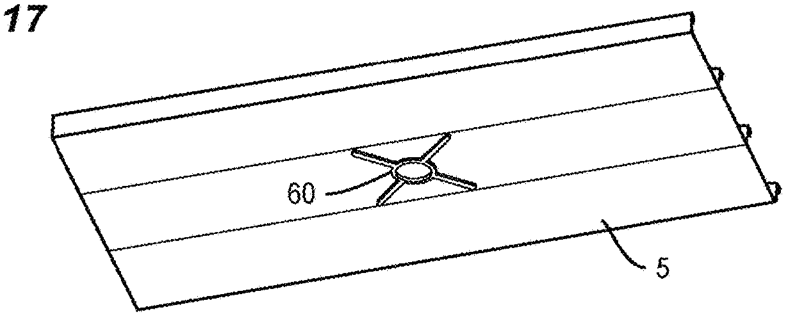
FIG. 18 shows the canopy of FIG. 17 with a mounting bracket added.
Figure 19:
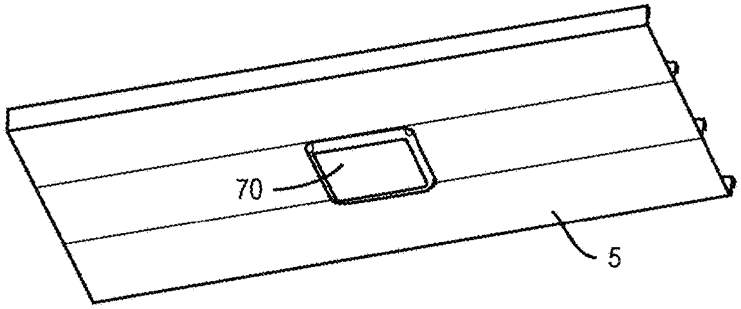
FIG. 19 shows the canopy of FIG. 18 with a light-emitting assembly added.
Figure 20:
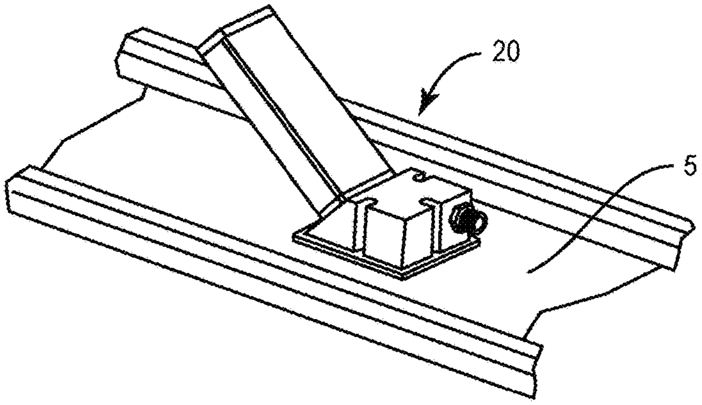
FIG. 20 show an upper perspective view of the canopy of FIG. 19 with a driver assembly added.
Figure 21:
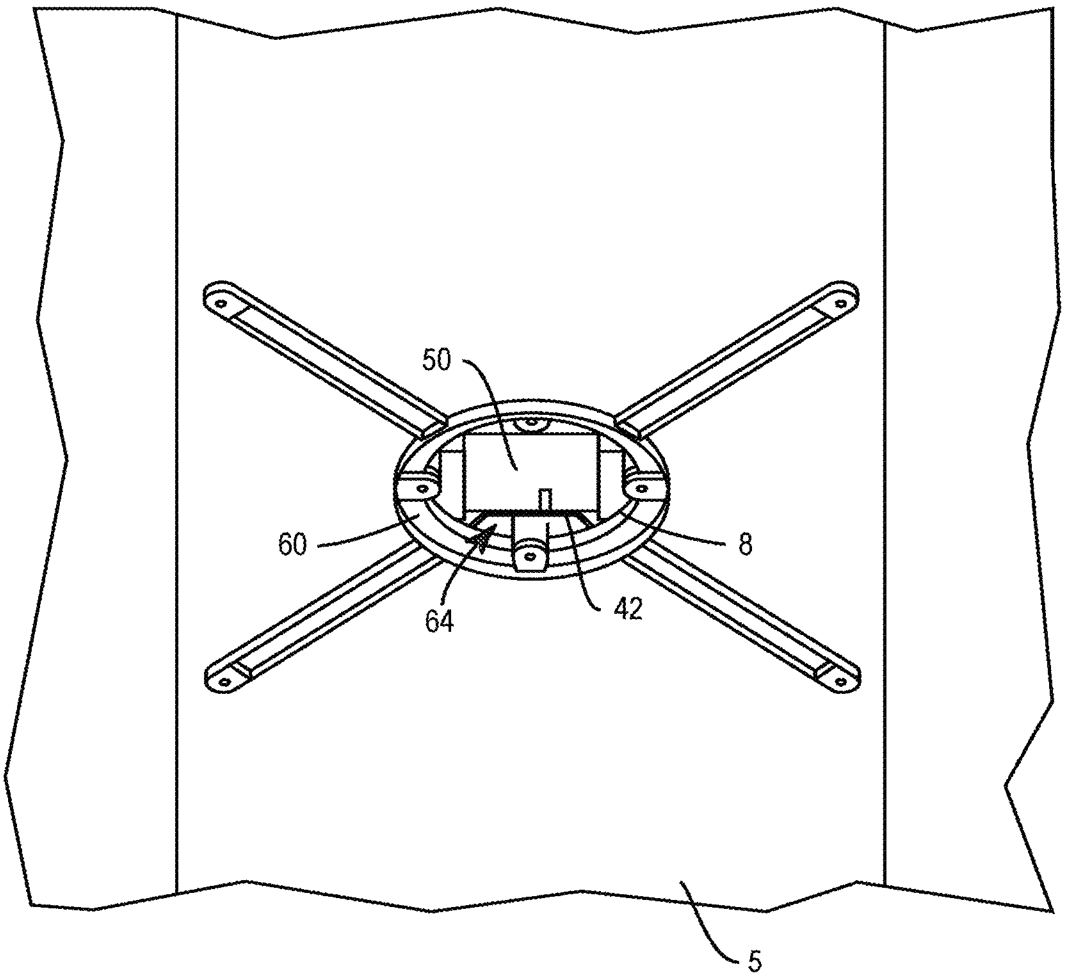
FIG. 21 shows a perspective view, from below, of the light fixture of FIG. 1 mounted to a canopy sheet, with an optional mounting bracket and with the light emitting assembly omitted/dismounted.
Figure 22:
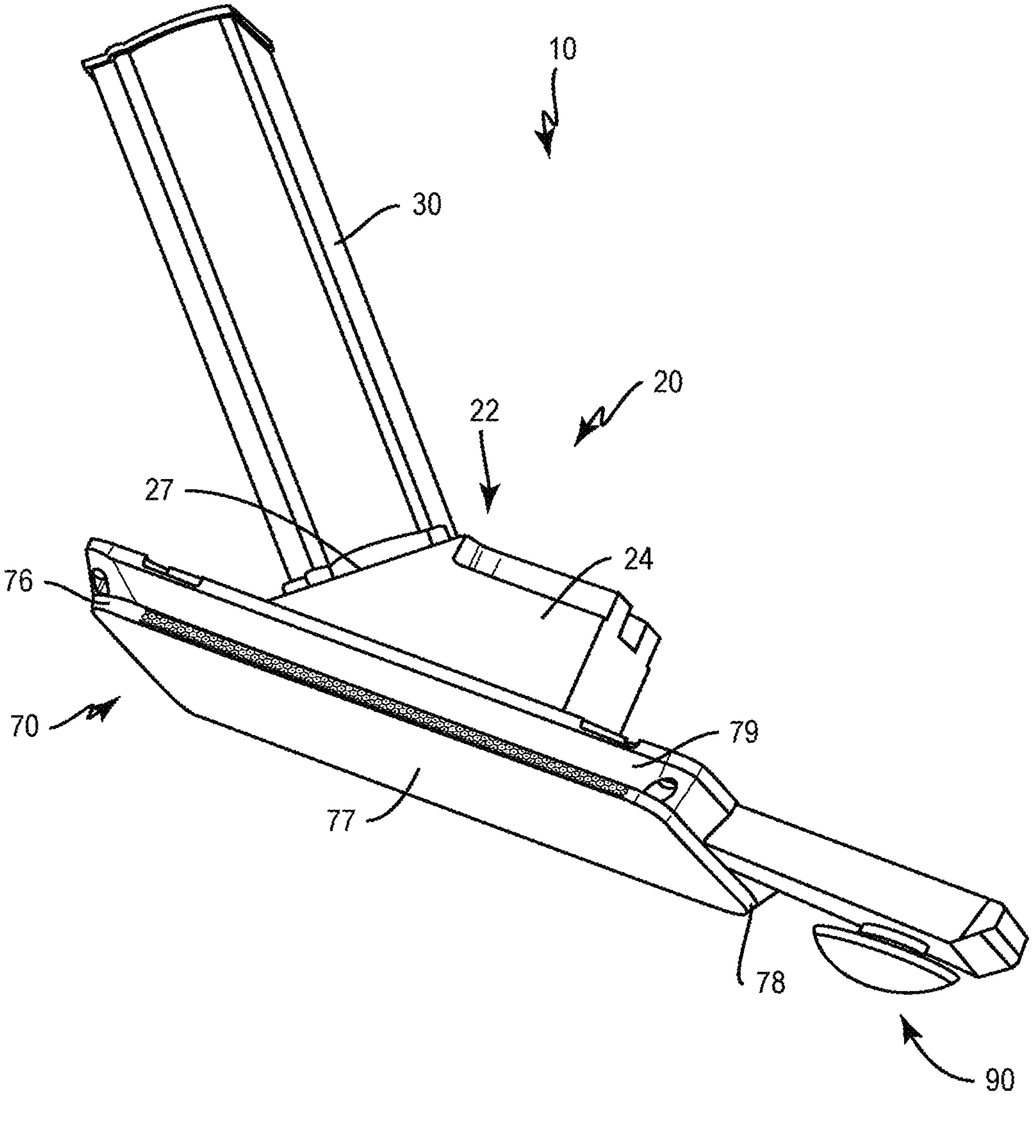
FIG. 22 shows a perspective view of the light fixture of FIG. 1, with an optional occupancy sensor.
Figure 23:
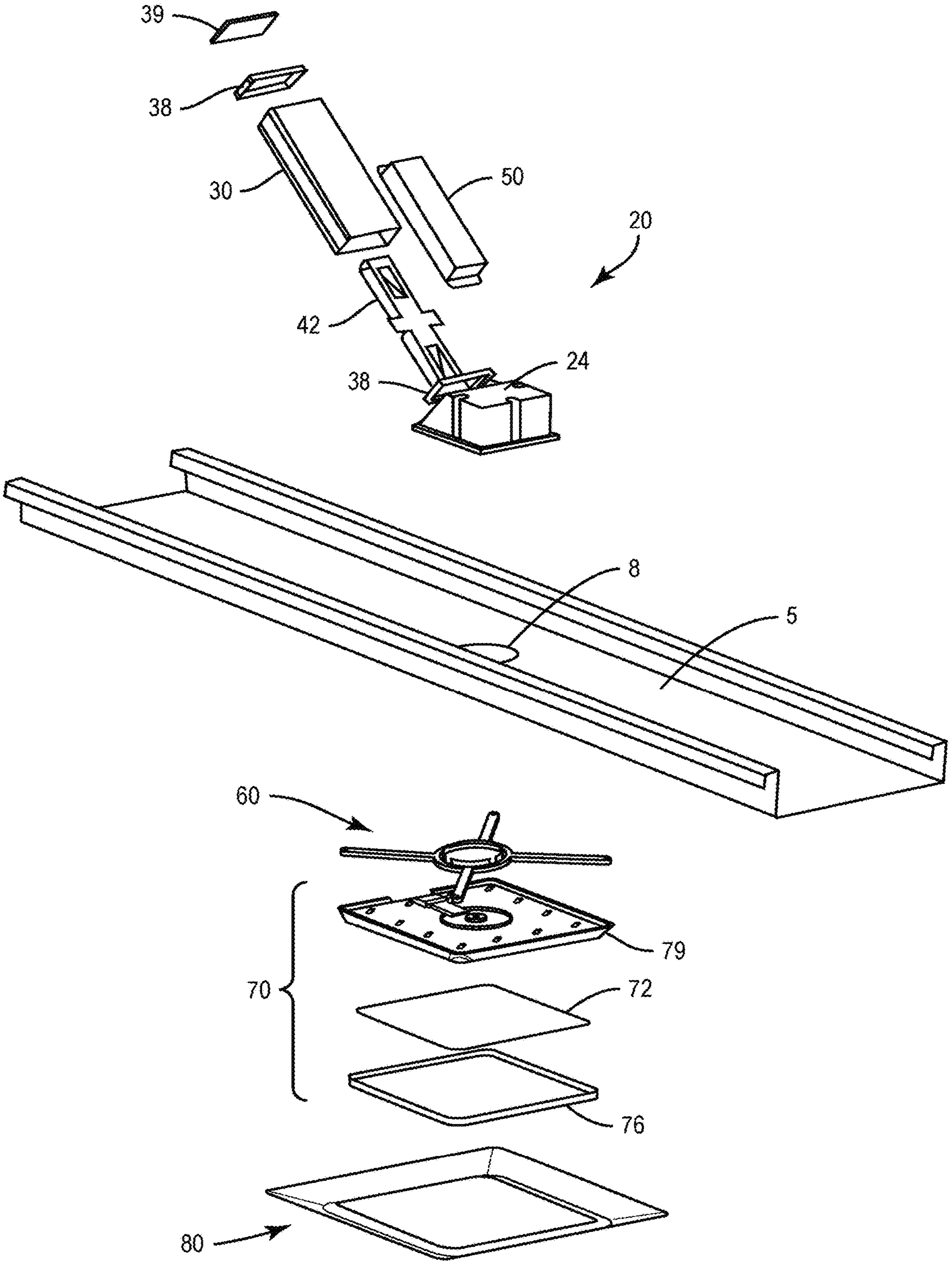
FIG. 23 shows a more exploded view of the light fixture of FIG. 2, with an associated canopy.

The light fixtures 10 described herein may their drivers 50 serviced or replaced from below. A method (400) of servicing an overhead light fixture 10 installed in an overhead canopy 3 is shown FIG. 16. As discussed above, the canopy 3 has a canopy sheet 5 and a fixture receiving opening 8 therethrough. As further described above, the overhead light fixture 10 includes a driver assembly 20 and a light-emitting assembly 70. The light-emitting assembly 70 is detachably secured to the canopy 3 and configured for downward emission of light from the light source 72 of the light-emitting assembly 70. The driver assembly 20 includes a driver 50 operatively connected to the light source 72. The driver assembly 20 is disposed above the canopy 3 and the light-emitting assembly 70 is disposed below the canopy 3. Starting with a light fixture 10 installed on the canopy 3, the method includes dismounting (410) the light-emitting assembly 70 from the canopy 3. FIG. 21 shows a simplified view from below at this point in the process, with the optional mounting bracket 60 present. As can be seen in FIG. 21, the driver 50 is accessible from below through the canopy opening 8 (and pass-through opening 64 of mounting bracket 60). The method continues with thereafter, removing (420) the driver 50 from below the canopy 3 by moving the driver 50 downward out the fixture-receiving opening. The method continues with, while the driver 50 is removed, servicing or replacing (430) the driver 50 with a replacement driver 50. The serviced or replacement driver 50 is installed (440) by moving the serviced or replacement driver 50 upward through the fixture-receiving opening 8. Once the serviced or replacement driver 50 is secured in position, the resulting view at this point in the process would be similar to that show in FIG. 21, but with the serviced or replacement driver 50 rather than the original driver 50. The method continues with remounting (450) the light-emitting assembly 70 to the canopy 3 and operatively connecting the light-emitting assembly 70 to the serviced or replacement driver 50. The operatively connecting may be a result of installing the driver, remounting the light-emitting assembly 70, or a separate operation performed at any suitable time.

As discussed above, in some aspects, the driver assembly 20 has a sleeve portion 30 extending upwardly away from the canopy sheet 5 at an angle α less than vertical, with the driver 50 detachably mounted in the sleeve portion 30. With such an arrangement, the removing (420) the driver 50 may include removing the driver 50 from the driver assembly 20 from below the canopy 3 by sliding the driver 50 out the sleeve portion 30 and out of the fixture-receiving opening 8, while maintaining the sleeve above the canopy 3. Likewise, the installing (440) may include sliding the serviced or replacement driver 50 upward through the fixture-receiving opening 8 and upward into the sleeve portion 30.

As discussed above, in some aspects, the driver assembly 20 includes a tray assembly 40 comprising a driver tray 42, with the driver 50 secured to driver tray 42. With such an arrangement, the removing (420) the driver 50 may include sliding the driver tray 42 along the sleeve portion 30.

In some aspects, the dismounting (410) the light-emitting assembly 70 comprises dismounting the light-emitting assembly 70 from a mounting bracket 60 secured to an underside of the canopy 3; the mounting bracket 60 having a pass-through opening 64 aligned with the fixture-receiving opening 8. With such an arrangement, the installing (440) may include sliding the serviced or replacement driver 50 upward through the pass-through opening 64; and the remounting (450) the light-emitting assembly 70 to the canopy 3 may include remounting the light-emitting assembly 70 to the mounting bracket 60.

The discussion above has generally been in the context of the light source 72 being LED based. However, it should be understood that the light source 72 could use any other technology known in the art, such as incandescent, light panels, florescent, etc., either alone or in combination with LEDs.

In some aspects, the light fixture 10 may further include an optional sensor 90 for detecting motion and/or when a person and/or vehicle is in the area lighted by the light fixture 10. See FIG. 22. The sensor 90 is operatively connected to the control circuitry (not shown) for the light fixture 10. In some aspects, the sensor 90 helps control the light source 72 of the light-emitting assembly 70, such as by causing one color of light to be emitted by light source 72 when no motion and/or no occupancy is detected, but another color of light to be emitted by light source 72 when motion and/or occupancy is detected, optionally with suitable hysteresis control between such modes. Brightness of the light emitted by light source 72 may likewise and/or additionally controlled in a similar manner. In some aspects, a single sensor 90 may be used to control a plurality of light fixtures 10, or each light fixture 10 may have a corresponding dedicated sensor 90. When light fixture 10 includes sensor 90 and a bezel 80, the bezel 80 advantageously includes a suitable notch or opening to allow mounting of the sensor to the light-emitting assembly 70.

In one aspect, optics are described herein employing micro-optical structures and waveguide components for delivery of directional light to wall, ceiling, and/or floor surfaces using down lighting and up lighting distributions. An optic for an LED array is provided comprising a radial arrangement of micro-optical structures for providing one or more down lighting distribution from the LED array, and a waveguide edge for providing one or more up-lighting distributions from the LED array. As described further herein, the optic can provide optical control of light distribution and/or reduced glare.

Turning now to specific components, the optic comprises a plurality of radially positioned micro-optical structures. In some embodiments, the optic is formed as a monolithic or single piece, although in other embodiments, the optic can be formed from two or more pieces. Micro-optical structures described herein can include refractive facets or prisms that collimate or diffuse light to provide one or more down lighting distributions. In some cases, the micro-optical structures have a Fresnel structure, architecture, and/or arrangement. The micro-optical structures can have refractive facets having any slope angle, draft angle, and/or facet spacing consistent with the objective of providing one or more down lighting distributions from an LED array. Each micro-optical structure can have a length in at least one dimension of 1 μm to 500 μm, 50 μm to 400 μm, 100 μm to 300 μm, 100 μm to 200 μm, 100 μm to 150 μm, 150 μm to 300 μm, 200 μm to 300 μm, 50 μm, 100 μm, 150 μm, 200 μm, 250 μm, 300 μm, 350 μm, 400 μm, 450 μm, or 500 μm. Such micron-scale micro-optical structures are contrasted with traditional Fresnel lens structures, which characteristically have lengths in at least one dimension in the millimeter dimensions, such as 1 mm or greater.

In some embodiments, micro-optical structures described herein can have a radial arrangement, such as in concentric rings. The micro-optical structures can be uniform over the radial arrangement in some instances. Alternatively, the micro-optical structures vary in geometry and/or size over the radial arrangement. The radial arrangement of micro-optical structures can control down lighting distribution. For example, in some embodiments, the radial arrangement of the micro-optical structures can provide a symmetric down lighting distribution. In other embodiments, the radial arrangement of the micro-optical structures can provide an asymmetric down lighting distribution.

A waveguide edge described herein can comprise an outer radial edge of the optic. The waveguide edge is oriented to direct light outward in one or more up-lighting distributions. In some cases, the one or more up-lighting distributions is symmetric, and in other cases, the one or more up-lighting distributions is asymmetric. In some embodiments where the optic comprises two or more parts, each respective part can comprise a waveguide edge. For example, when an optic comprises two parts, a first optic and a second optic, the first optic can have a first waveguide edge and the second optic can comprise a second waveguide edge. The first waveguide edge can have the same up-lighting distributions as the second waveguide edge in some cases, or, in other cases, the first and second waveguide edges can have different up-lighting distributions. In some embodiments, the first optic can have a first waveguide edge, but the second optic does not have a waveguide edge, such that the first optic produces both up-lighting and down lighting distributions and the second optic only produces down lighting distributions. In a similar fashion, the first waveguide edge and the second waveguide edge can both have a symmetric up-lighting distribution or an asymmetric up-lighting distribution. Alternatively, the first and second waveguide edges have different up-lighting distributions. In some embodiments, a waveguide edge described herein can direct light outward in one or more up-lighting distributions having an angle of 5°-30°, 10°-25°, 15°-20°, 5°, 10°, 15°, 20°, 25°, or 30° from a plane normal to nadir.

As described in more detail herein, the optic is configured to receive light from an LED array, and the optic can direct a percentage of the received light to the waveguide edge. In some embodiments, the waveguide edge receives up to 5%, up to 7%, up to 9%, up to 10%, up to 12%, up to 14%, up to 15%, up to 16%, up to 20%, 5% to 20%, 8% to 20%, 10% to 20%, 12% to 20%, 14% to 20%, 15% to 20%, 10% to 18%, 10% to 16%, 10% to 15% or 10% to 13% of the total light produced by the LED array. In some embodiments, when micro-optical structures described herein are arranged in concentric rings, one or more of the concentric rings can direct a percentage of received light to the waveguide edge for up-lighting distribution, with the remaining percentage of the light being emitted as one or more down-lighting distributions. In some cases, a portion of light received from only one or more of the concentric rings is directed to the waveguide edge, whereas light from the other concentric rings is emitted as down lighting distributions. For example, as described in more detail herein with reference to FIG. 26, a portion of light received from concentric ring 121*e* can be emitted from the waveguide edge for up-lighting distribution, whereas light from concentric rings 121*a*-121*d* is emitted as downlighting distributions. However, this is merely an example, and in other embodiments, a portion of light received from more than one of the concentric rings 121*a*-121*e* can be emitted from the waveguide edge as up-lighting distribution. Thus, in some embodiments, the up-lighting and down lighting distributions can be selected and controlled independently from one another.

An optic described herein having micro-optical structures employing Fresnel architecture can be formed of any light transmissive material of suitable refractive index. In some embodiments, the optic is formed of glass or radiation transmissive polymeric material. Suitable radiation transmissive polymeric materials include acrylics, silicones, or polycarbonates.

Figure 24:
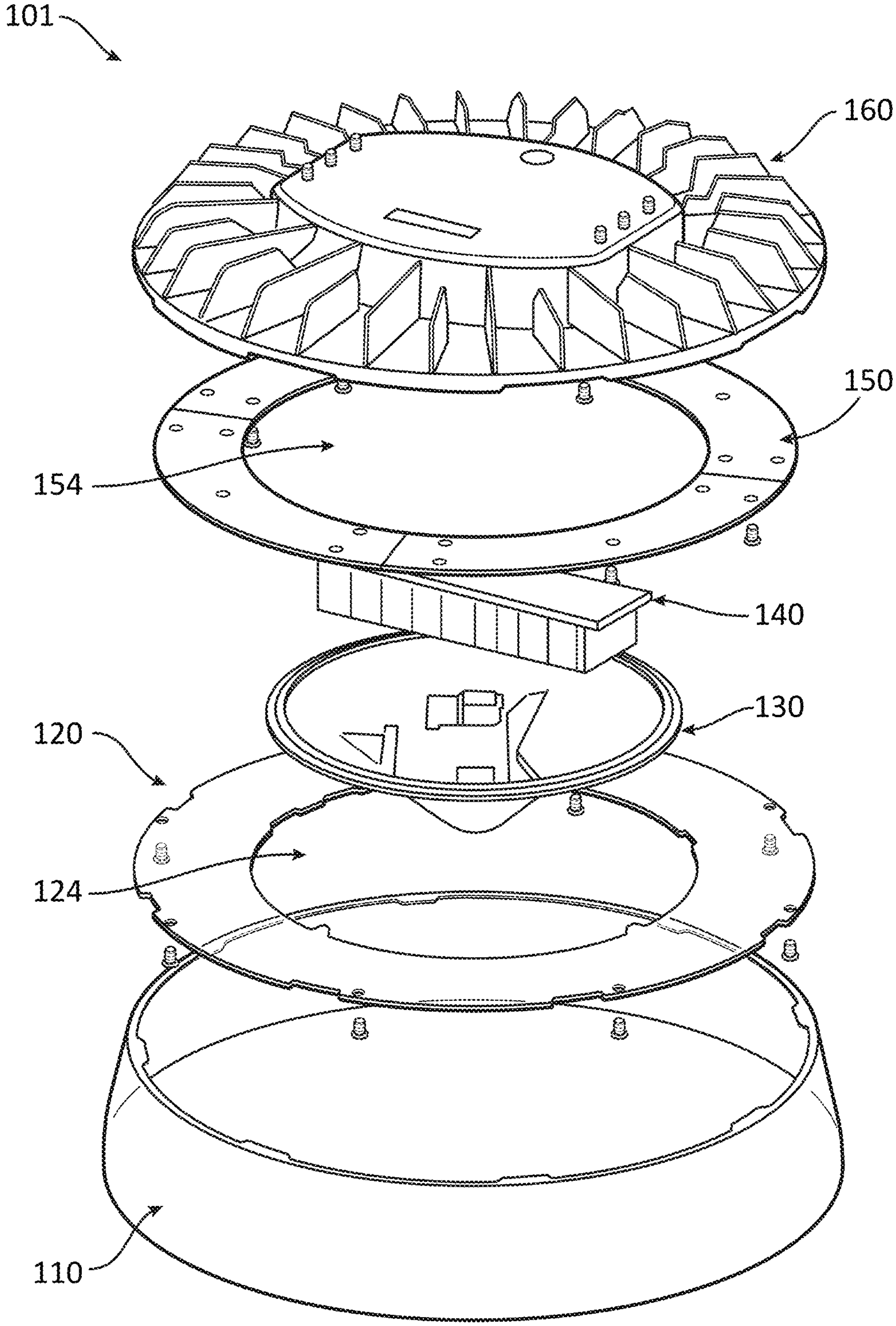
FIG. 24 is an exploded view of a luminaire having an optic according to some embodiments described herein.
Figure 25:
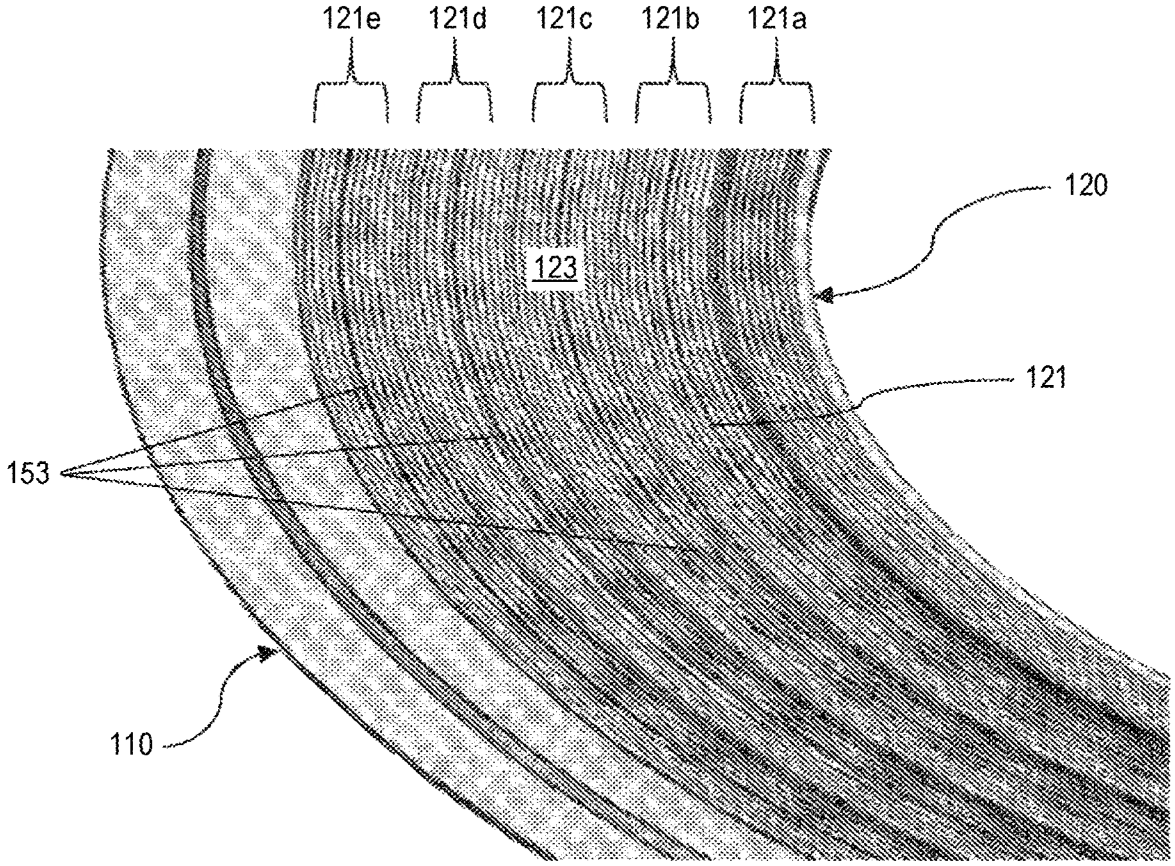
FIG. 25 is a perspective view of a portion of an optic according to some embodiments described herein.
Figure 26:
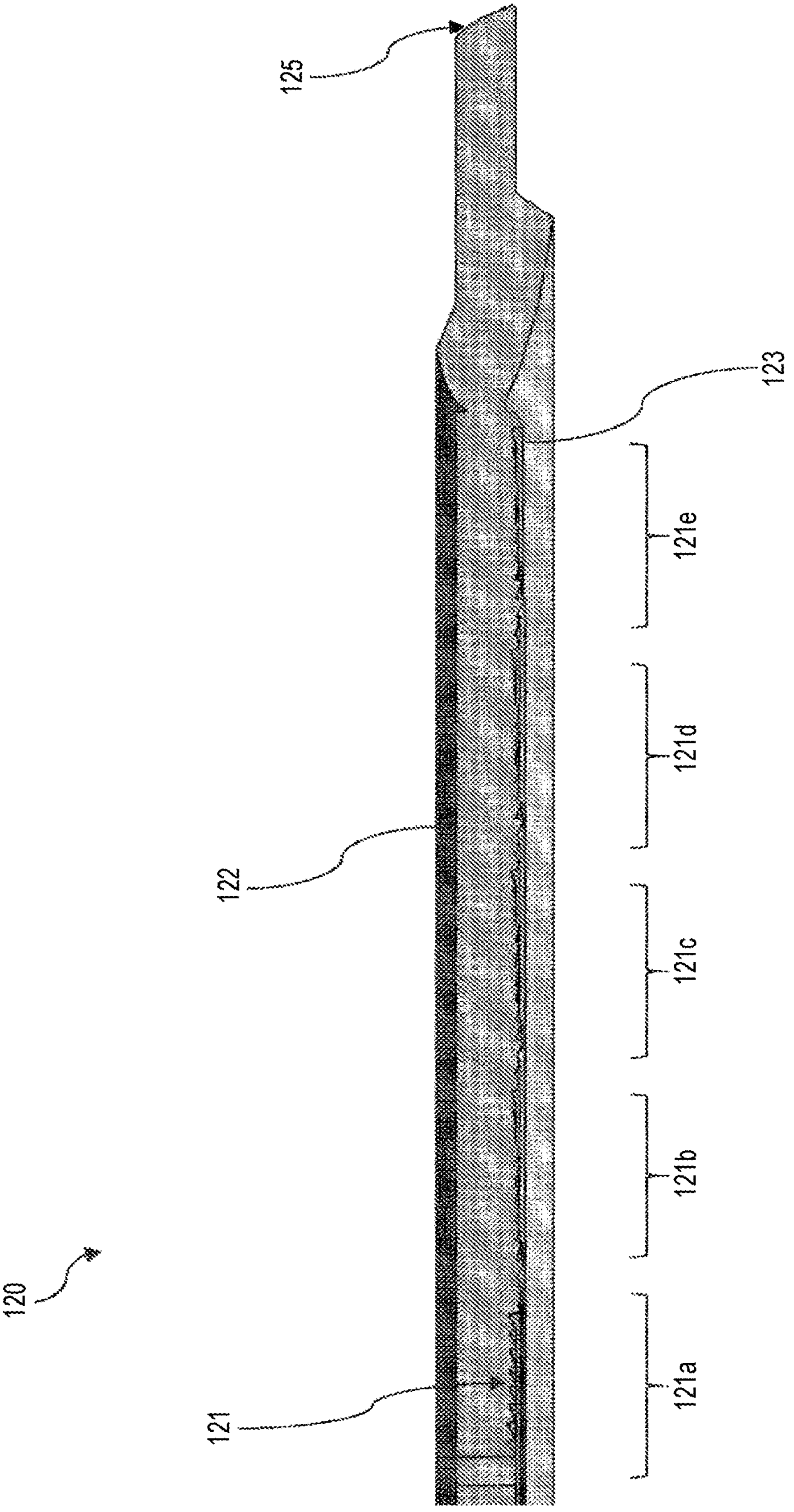
FIG. 26 is a cross-sectional view of the optic of FIG. 25.

FIG. 24 illustrates one non-limiting embodiment of a luminaire comprising an optic described herein. In FIG. 24, luminaire 101 comprises at least an optic 120 and an LED array 150. FIGS. 25 and 26 show a light emitting surface 123 and a cross-sectional view, respectively, of optic 120. In FIG. 25, an embodiment of optic 120 is shown having a plurality of micro-structures 121 arranged as concentric rings 121*a*-121*e*. Concentric rings 121*a*-121*e* can be circular, elliptical, or any other arcuate shape consistent with the objectives of this disclosure. While FIG. 25 shows optic 120 having five concentric rings, optic 120 is not limited to this, but rather, in other instances can have more or less concentric rings, such as one, two, three, four, six, seven, eight, nine, ten or more concentric rings. As illustrated in FIG. 26, optic 120 has a light receiving surface 122, and an opposite light emitting surface 123. Waveguide edge 125 is positioned on an end of optic 120, and a surface of the waveguide edge 125 extends orthogonal or oblique to the light receiving surface 122 and/or the light emitting surface 123. Concentric rings 121*a*-121*e* are formed by micro-optical structures 121, with the micro-optical structures 121 being positioned proximate to, on, or forming the light emitting surface 123. Optic 120 can additionally comprise a centrally located aperture, such as central aperture 124 shown in FIG. 24.

Figure 27:
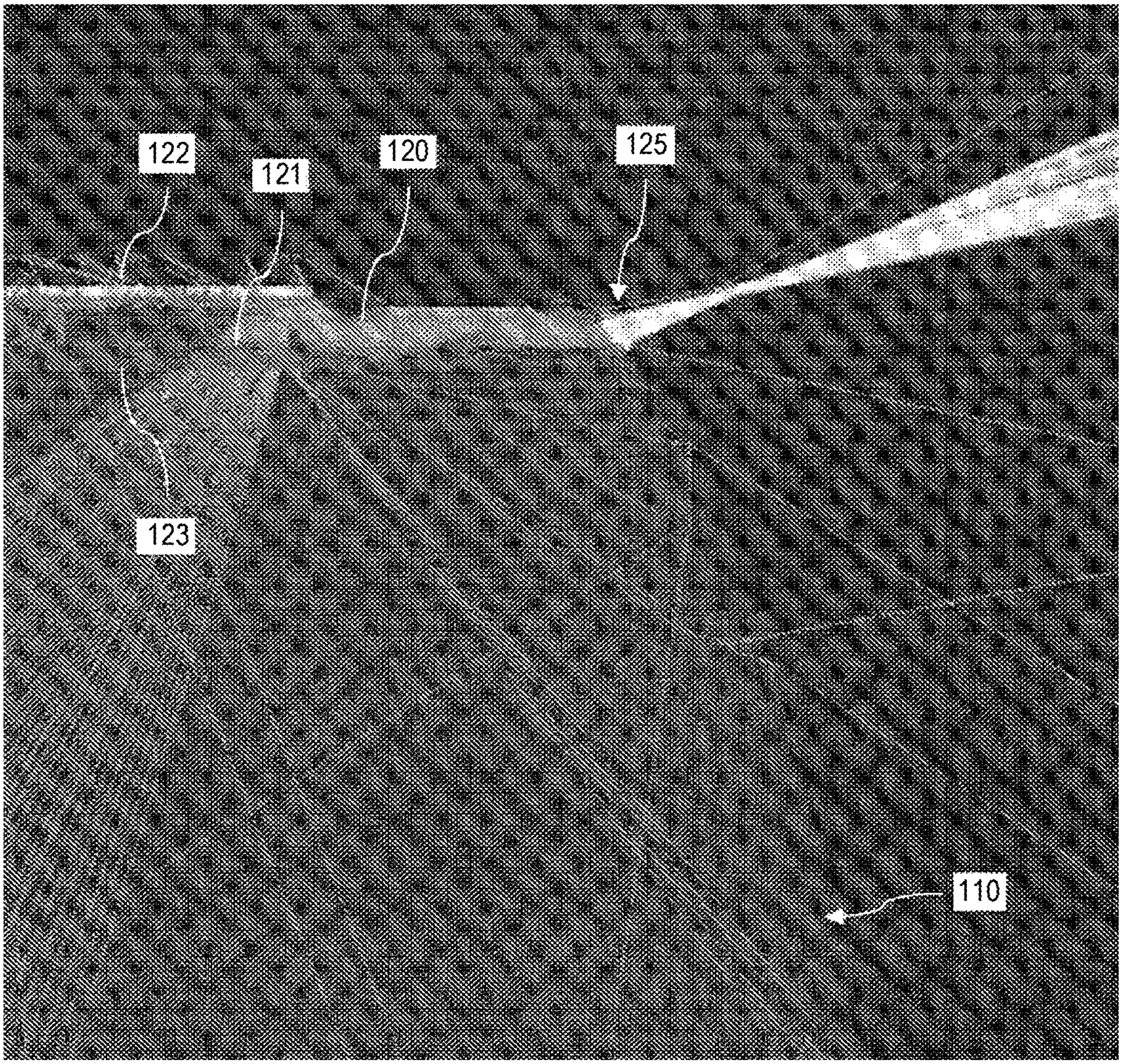
FIG. 27 is a ray diagram of up-lighting and down lighting distribution of light by an optic according to some embodiments described herein.
Figure 28A:
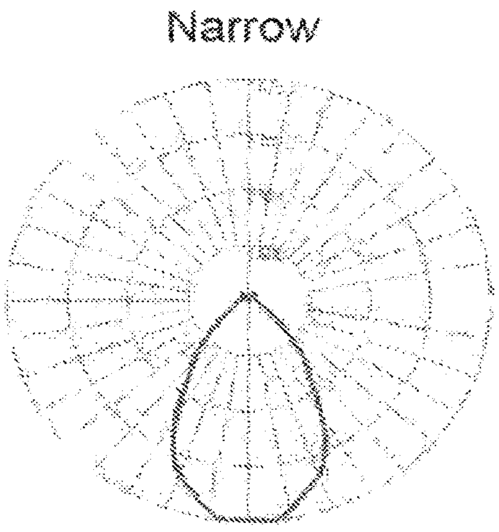
FIGS. 28A-28D illustrate lighting distribution of optics according to some embodiments described herein.
Figure 28B:
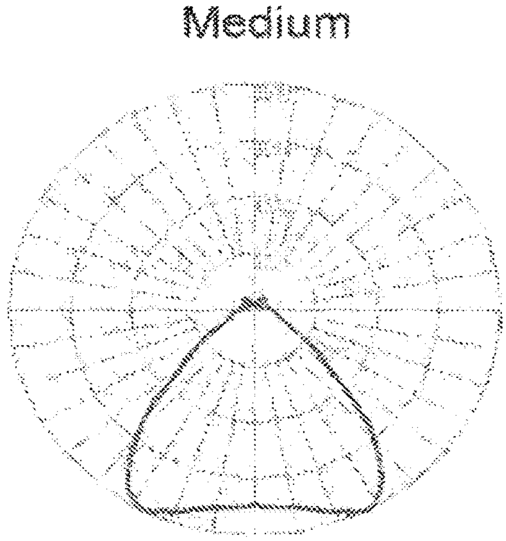
Figure 28C:
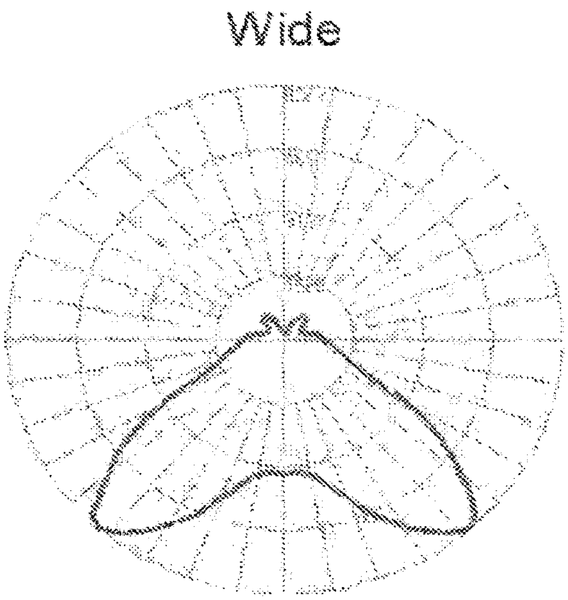
Figure 28D:
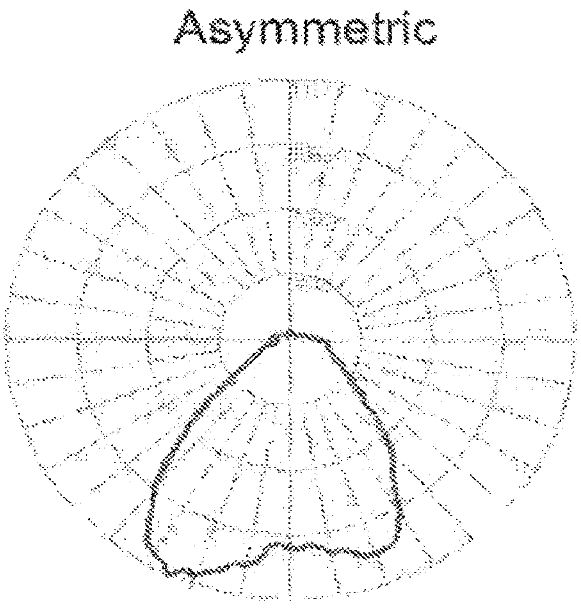

FIG. 27 shows a ray diagram of optic 120 connected to glare shield 110. Light enters optic 120 through the light receiving surface 122, and a portion of the light exits the light emitting surface 123 after interacting with the micro-optical structures 121. The micro-optical structures 121 redirect the received light in one or more down lighting distributions. The arrangement pattern of the micro-optical structures 121 can determine parameters of down lighting distribution, such as narrow (FIG. 28A), medium (FIG. 28B), wide (FIG. 28C), or asymmetric (FIG. 28D). Narrow down lighting distribution can comprise approximately up to +/−30° from nadir. Medium down lighting distribution can comprise approximately +/−31° to +/−45° from nadir. Wide down lighting distribution can comprise approximately +/−46° to +/−60° or more from nadir.

As previously described, micro-optical structures 121 can comprise micron-scale facets or prisms redirecting at least a portion of the light exiting the light emitting surface 123 in one or more directions away from an axis extending normal to the light emitting surface 123, also described as nadir. Facets of the micro-optical structures can have any geometry and design for providing desired lighting distributions via redirection of light away from the collimation axis. In some embodiments, for example, facets redirect light from the collimation axis at one or more angles greater than 1°, 3°, 5°, 10°, 15°, 20°, 25°, 30°, 35°, 40°, 45°, 50°, 55°, 60°, or greater than 60°.

In some embodiments, the micro-optical structures are arranged in an array. When in array format, the facets of the micro-optical structures can have uniform spacing or non-uniform spacing. Moreover, in some embodiments, one or more facets of the micro-optical structures can intersect the axis at an angle supporting redirection of the light by total internal reflection. For intersection angles not supporting total internal reflection, facets can comprise reflective surface coatings and/or redirect light away from the axis by refraction. In some embodiments, an array of micro-optical structures comprises any combination of micro-optical structures comprising facets redirecting light by total internal reflection, specular or diffuse reflection and/or refraction. Light redirection mechanism of individual micro-optical structures can be selected according to several considerations including, but not limited to, position of the micro-optical structure in the array, facet angle of the micro-optical structures, design of neighboring micro-optical structures, and desired lighting distribution provided by the optic.

In another aspect, luminaires are described herein comprising optics employing micro-optical structures and waveguide components for delivery of directional lighting to wall, ceiling, and/or floor surfaces using down lighting and up lighting distributions. Luminaires described herein are not limited to specific design and/or lighting application, and can provide multi-directional light distributions as high bay fixtures, low bay fixtures, or any fixture consistent with the objectives of this disclosure. In some embodiments, luminaires are mounted on the ceiling. Alternatively, in some instances, luminaires can be mounted on the floor for delivery of directional light to wall, floor, and/or ceiling surfaces. As described further herein, an optic above can assist in providing both down-lighting distributions and up-lighting distributions from luminaires described herein.

Luminaires described herein, can comprise an LED light source; and an optic covering the LED array, the optic comprising a radial arrangement of micro-optical structures for providing one or more down lighting distributions form the LED array, and a waveguide edge for providing one or more up-lighting distributions from the LED array. In the one embodiment shown in FIG. 24, luminaire 101 comprises LED array 150 light source and optic 120 covering an LED light source 150. The optic can have any construction and/or properties described herein, such as those described for optic 120.

The LED light source can be arranged in an array format, including one-dimensional LED arrays or two-dimensional LED arrays. The LED light source 150 shown generally in FIG. 24 comprises a light emitting surface 152 onto which a two-dimensional array of LEDs is positioned, as illustrated in more detail in FIGS. 25, 29A, and 29B. Generally, the LED light source 150 has a shape complementary to the shape of the optic. In the example shown in FIG. 24, LED light source 150 has an annular shape corresponding to the annular shape of optic 120. In some instances, LED light source 150 has a central aperture 154. In other embodiments, the LED light source 150 has a continuous light emitting surface 152 extending across the area labeled as central aperture 154, where the area comprising central aperture 154 has additional concentric rings of LED light sources 150 with decreasing diameters.

In some embodiments, a plurality of LEDs 153 are distributed in concentric rings having a spatial position corresponding to concentric rings 121*a*-121*e* formed by micro-optical structures 121 on optic 120, such that when the optic 120 covers the LED array 150, each concentric ring of LEDs 153 is positioned proximate to at least one of the concentric rings 121*a*-121*e* of micro-optical structures 121. FIG. 25 illustrates an overlay of concentric rings of LEDs 153 with the concentric rings 121*a*-121*e* of micro-optical structures 121. In some cases, one, two, or more than two concentric rings of LEDs 151 are positioned proximate to one of the concentric rings 121*a*-121*e* of micro-optical structures 121, such that light emitted from the one, two, or more than two concentric rings of LEDs 151 is emitted from optic 120 in a down lighting distribution after interacting with micro-optical structures 121 of one of the concentric rings 121*a*-121*e*.

Figure 29A:
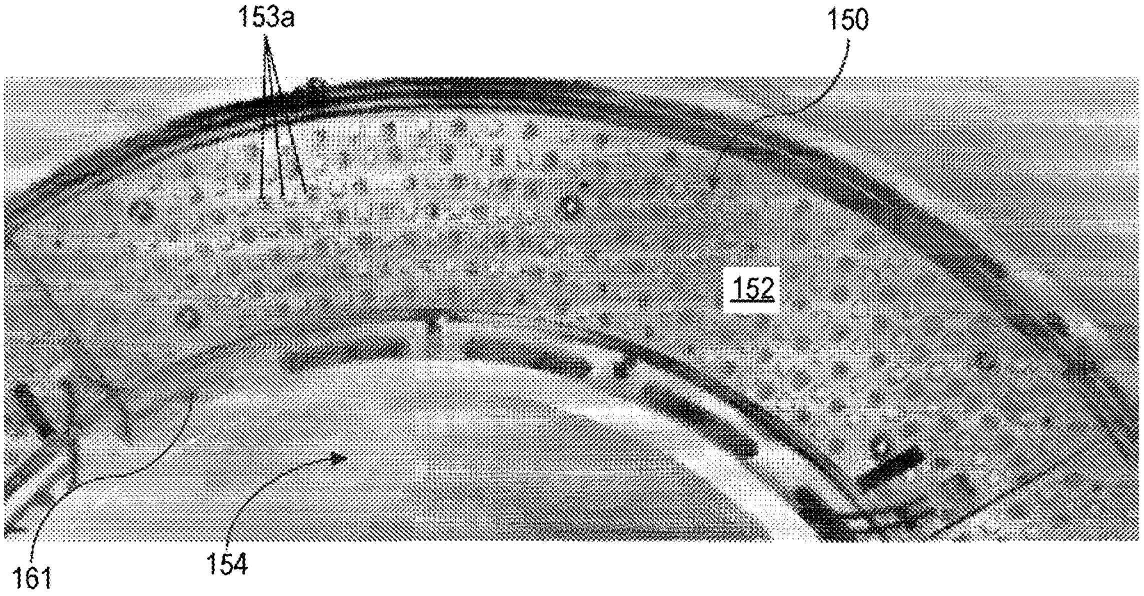
FIG. 29A illustrates symmetrical light emitting diode positioning on an LED array according to some embodiments described herein.
Figure 29B:
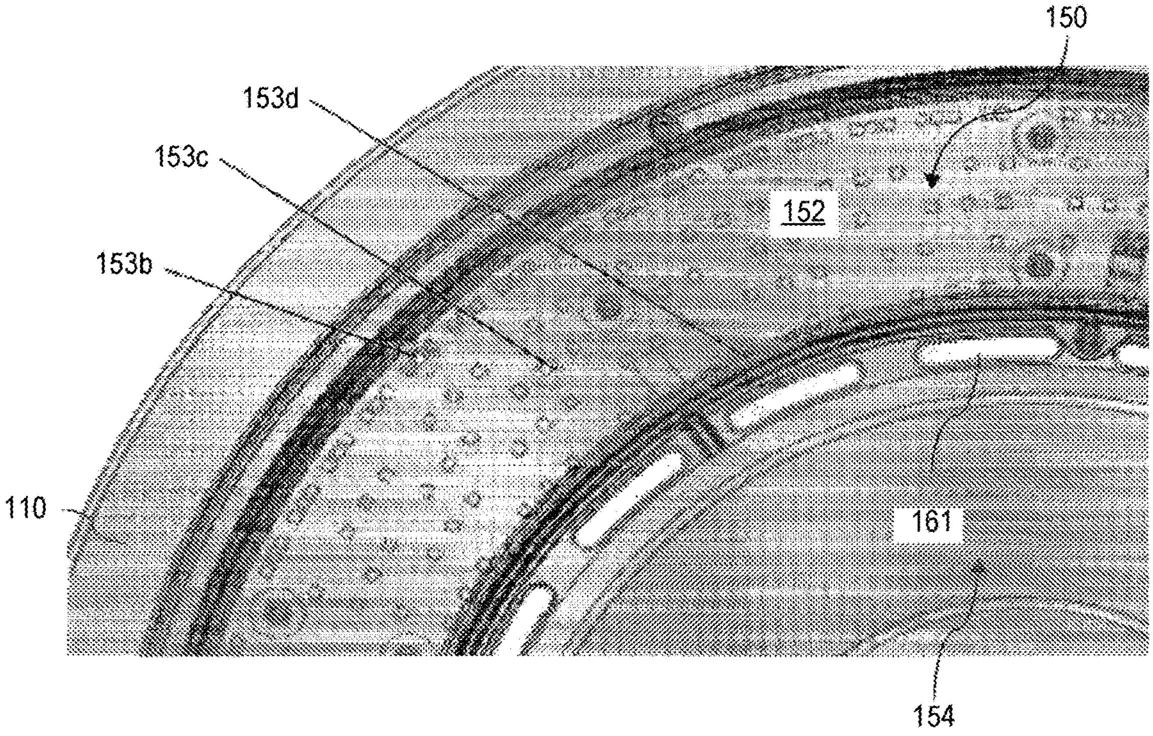
FIG. 29B illustrates asymmetrical light emitting diode positioning on an LED array according to some embodiments described herein.

In some embodiments, LED array 150 comprises a plurality of LEDs 153*a* positioned in concentric rings where the plurality of LEDs 153*a* in each concentric ring are positioned approximately equidistance from each other, as shown for example in FIG. 29A. In other embodiments, the LED array 150 comprises a plurality of LEDs 153*b*-153*d* positioned in concentric rings, where the plurality of LEDs 153*b*-153*d* in each concentric ring are positioned at varying distances from each other, as shown for example in FIG. 29B. In FIG. 29B, each of the plurality of LEDs 153*b*, 153*c*, and 153*d* are positioned in different concentric rings, and each concentric ring has a different LED spacing pattern and number of LEDs than the other concentric rings. Thus, depending on the application, LEDs can be clustered or spread out in different concentric rings, giving control of down lighting distribution patterns. Particularly shown in FIG. 29B is an embodiment where LEDs 153*b* are positioned in an outermost concentric ring in a higher density and tighter spacing than the other concentric rings. This embodiment can be advantageous in some cases because, as described above, a portion of light incident on the outermost concentric ring 121*e* of micro-optical structures 121 may be diverted to the waveguide edge 125 and emitted therefrom in an up-lighting distribution. By decreasing the spacing between the LEDs 153*b*, the density (total number) of the LEDs 153*b* in the outermost concentric ring of LED array 150 is increased. Correspondingly, since a portion of the received light may be diverted to the waveguide edge 125 from concentric ring 121*e* of optic 120, by decreasing the spacing and increasing the number of LEDs in ring 121, an intensity of the down lighting distribution from optic 120 for the outermost concentric ring 121*e* can be maintained to be equal to one or more intensities of down lighting distributions of the other concentric rings 121*a*-121*d*. Furthermore, in some embodiments, only a portion of light incident on concentric ring 121*e* is diverted to waveguide edge 125, whereas light incident on concentric rings 121*a*-121*d* is passed through the micro-optical structures 121 in one more down lighting distributions without diverting the incident light to waveguide edge 125. Up-lighting and down lighting distributions of luminaires can therefore be selected independently from one another. In some embodiments, the LEDs in the LED array 150 that emit light ultimately emitted from the waveguide edge 125 as one or more up-lighting distributions, can be independently selected for the same or different spectral characteristics and features than LEDs whose light is emitted solely as down lighting distributions. For example, in some cases, one or more up-lighting distributions are of different color than the one or more down lighting distributions.

As used herein, the term "LED" can comprise packaged LED chip(s) or unpackaged LED chip(s). LED array 150 can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, and the like. The LED array can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to the heatsink or another type of board or substrate. Depending on the embodiment, the luminaire can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In cases where a soft white illumination with improved color rendering is to be produced, each LED array 150 can include one or more blue shifted yellow LEDs and one or more red or red/orange LEDs as described in U.S. Pat. No. 7,213,940, assigned to the assignee of the present invention and hereby incorporated by reference. The LEDs can be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. In one embodiment, the LED array 150 comprises any LED, for example, an XP-Q LED incorporating TrueWhite®™ LED technology or as disclosed in U.S. Pat. No. 9,818,919, granted Nov. 14, 2017, entitled "LED Package with Multiple Element Light Source and Encapsulant Having Planar Surfaces" by Lowes et al., the disclosure of which is hereby incorporated by reference herein. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the luminaire can be controlled.

As shown in the embodiment of FIG. 24, luminaire 101 can further comprise one or more of a glare shield 110, a sensor assembly 130, an LED driver 40, and a heatsink 160.

Figure 31A:
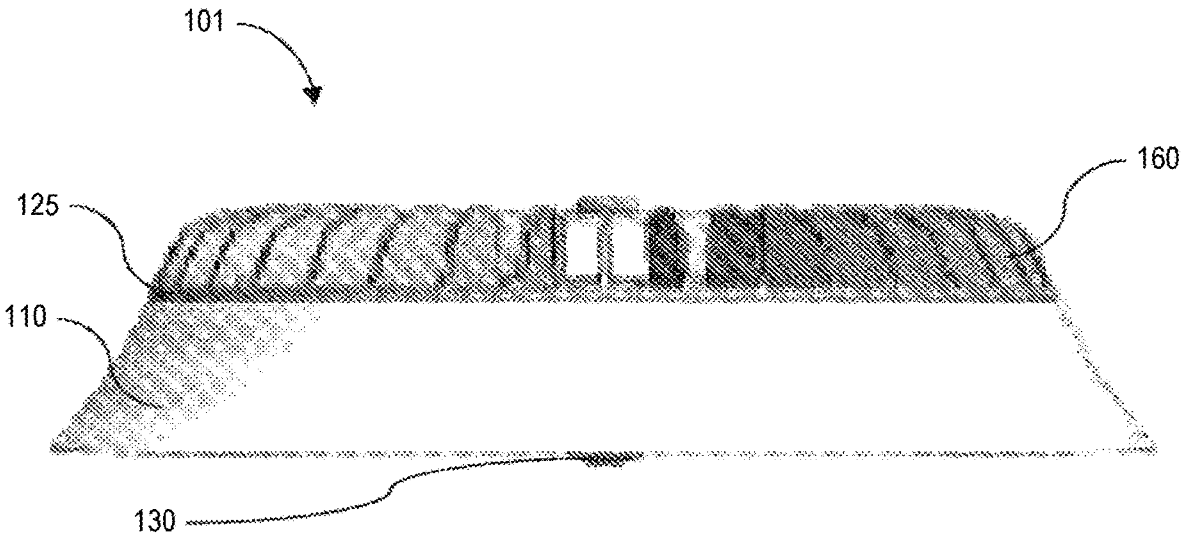
FIG. 31A is a side view of a luminaire incorporating one embodiment of a glare shield.
Figure 31B:
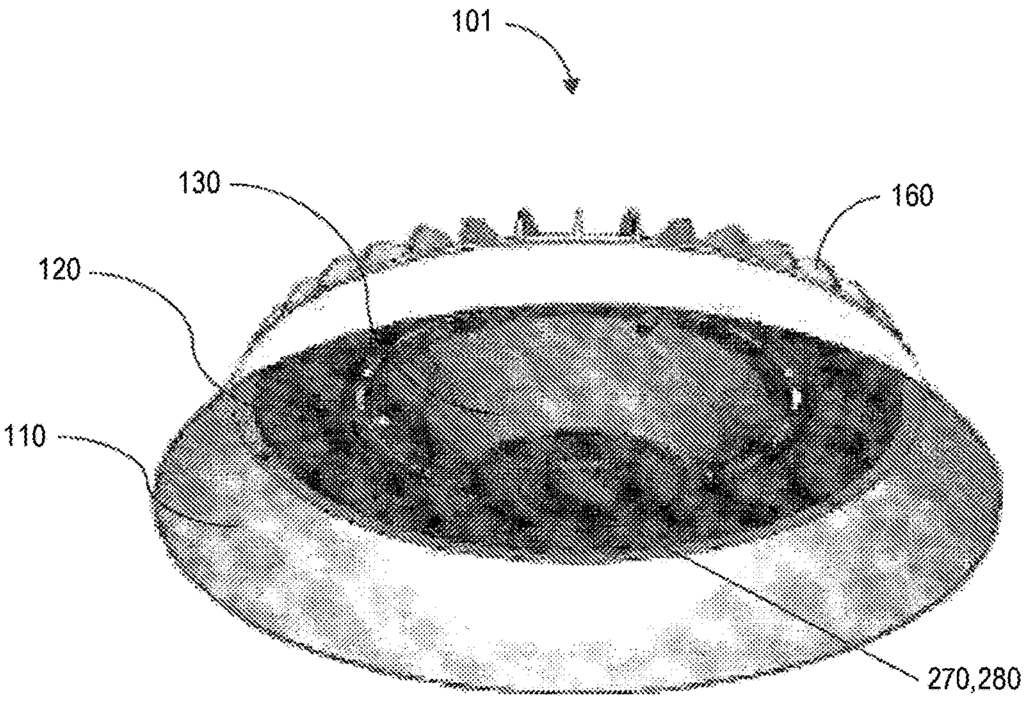
FIG. 31B is a bottom perspective view of the luminaire of FIG. 31A.

Glare shield or shroud 110 can be a monolithic element or can be formed of two or more segments having the same or differing optical properties. FIGS. 31A and 31B illustrate a side view and a bottom perspective view of a luminaire incorporating one embodiment of a glare shield. The glare shield 110 in the embodiment of FIGS. 31A and 31B can comprises a clear or diffuse material that can be formed of any desired material including clear or translucent polymeric materials, such as acrylic or polycarbonate. Alternative, glare shield 110 can be opaque, being formed from a non-translucent material, including metal.

Sensor assembly 130 can be positioned in the central aperture 124 of optic 120 and/or central aperture 154 of LED array 150, such as in the embodiments shown in FIGS. 24. Additionally, as described in more detail below, sensor assembly 130 can be positioned in a receiving space of heatsink 160 housing 163. Placement in the central aperture 124, 154 can enable the sensor assembly 130 to connect directly to driver assembly 130, which can also be positioned in the central aperture 124, 154. In other embodiments, the sensor assembly is separate from and not integral with the luminaire and can include networking, wired and/or wireless coupling to the luminaire. Further, the sensor assembly 130 can be recessed in the central aperture 124, 154, such as in housing 163, precluding light from the LED array 150 from directly striking the sensor assembly 130. The sensor assembly 130 can have one or more sensors and/or functionalities including, but not limited to, low level light imaging and/or occupancy detection. In other embodiments, other sensor assemblies can be used.

In some embodiments, sensor assembly 130 can incorporate an effective motion detection system based upon a visible light focal plane array such as a color or monochrome CMOS camera, in conjunction with imaging lens and digital processing. Physically, such motion detection sensor may closely resemble a camera module from a smartphone. Appropriate sensors may include those made by the Aptina division of On Semiconductor, by Ominivsion or others. Appropriate lens assemblies may result in a sensor module field of view from 70 degrees to 120 degrees. Relatively inexpensive camera modules with resolution as low as (640×480) or (1290×960) can deliver fundamental ground sampled resolution as small as 2 cm from a height of 20 feet, more than sufficient to detect major and minor motions of persons or small industrial vehicles such as forklifts.

For operation in zero light environments, sensor assembly 130 can comprise supplemental illumination provided by optional features, such as a low-power near IR LED illuminator or a low power mode of the luminaire itself where the luminaire remains on at 0.5% to 10.0% of full power.

Figure 32:
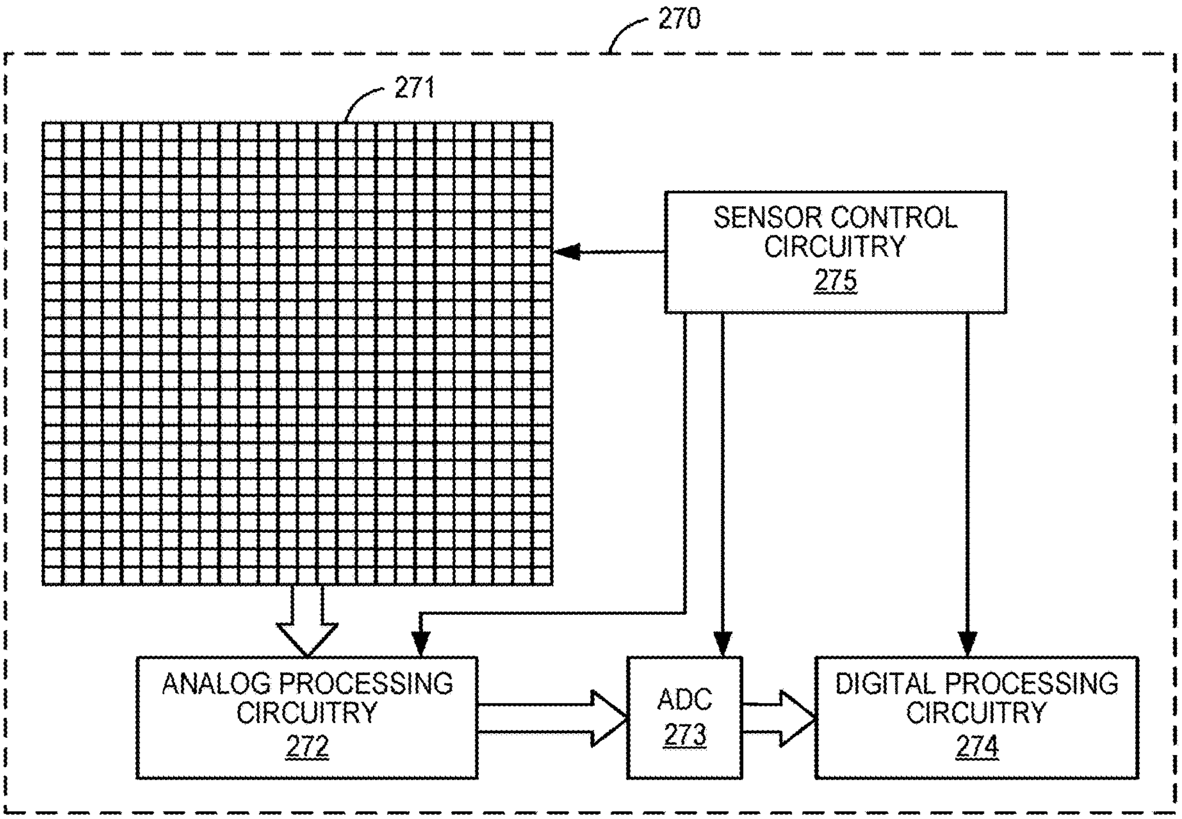
FIG. 32 illustrates components of an image sensor according to some embodiments described herein.

In some embodiments, sensor assembly 130 can comprise an image sensor, as well as an optional a focal plane array and one or more optics. The image sensor, for example, can be a charge-coupled device (CCD), complimentary metal-oxide semiconductor (CMOS) or any other type of image sensor. Suitable image sensors can include those made by the Aptina division of On Semiconductor, by Omnivision or others. The image sensor, in some embodiments, is positioned to capture a field of view corresponding or substantially corresponding to an area that is illuminated by the luminaire. Details of a CMOS-based image sensor are illustrated in the non-limiting embodiment of FIG. 32. While a CMOS-based image sensor 270 is illustrated, those skilled in the art will appreciate that other types of image sensors, such as CCD-based sensors, can be employed. The image sensor 270 generally includes a pixel array 271, analog processing circuitry 272, an analog-to-digital converter (ADC) 273, digital processing circuitry 274 and sensor control circuitry 275. In operation, the pixel array 271 will transform light that is detected at each pixel into an analog signal and pass the analog signal for each pixel of the array 271 to the analogy processing circuitry 272. The analog processing circuitry 272 will filter and amplify the analog signals to create amplified signals, which are converted to digital signals by the ADC 273. The digital signals are processed by the digital processing circuitry 274 to create image data corresponding to the captured image.

The sensor control circuitry 275 will cause the pixel array 271 to capture an image in response to an instruction, for example, from a control system. The sensor control circuitry 275 controls the timing of the image processing provided by the analog processing circuitry 272, the ADC 273 and the digital processing circuitry 274. The sensor control circuitry 275 also sets the image sensor's processing parameters, such as the gain and nature of filtering provided by the analog processing circuitry 272 as well as the type of image processing provided by the digital processing circuitry 274.

Figure 33:
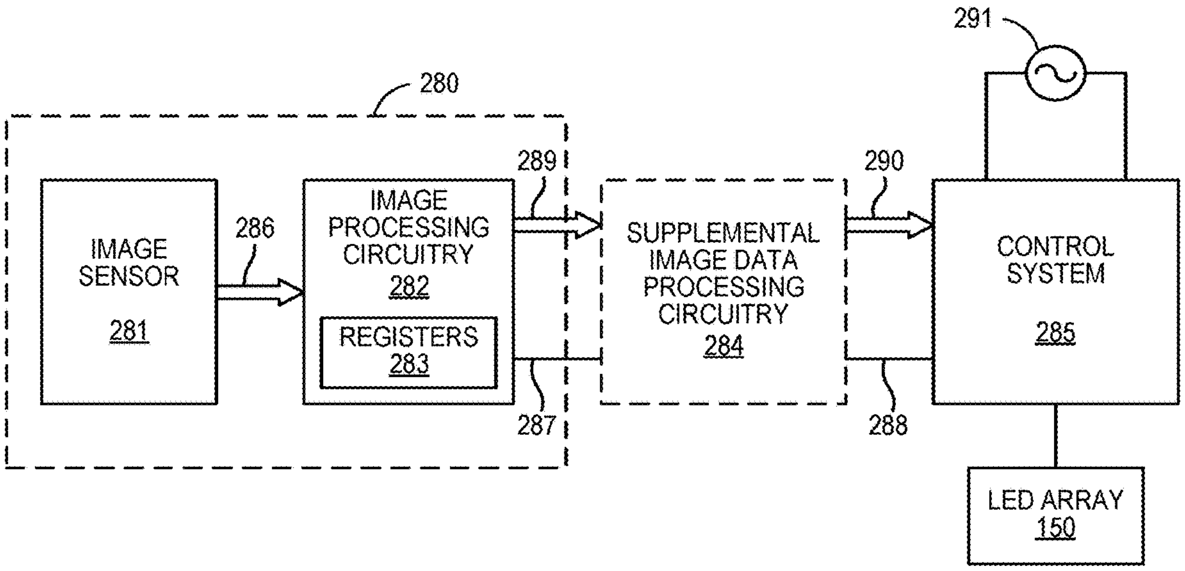
FIG. 33 is a block diagram illustrating electronic components of a luminaire according to some embodiments described herein.

FIG. 33 illustrates an electrical block diagram of a luminaire employing sensor module 280 in the sensory assembly 130. The sensor module 280 comprising an image sensor 281 according to some embodiments. The sensor module 280 also comprises image processing circuitry 282, which in turn includes a number of registers 283, optional supplemental image data processing circuitry 284 and a control system 285. The LED array 150 can be electronically connected to the control system 285 in some instances. The sensor module 280 can be a system on chip (SoC) in which the image sensor 281 and processing circuitry 282 are integrated onto a single chip. The supplemental image processing circuitry 284 can be provided either together or separately from the sensor module 280. The supplemental image data processing circuitry 284 can be used to offload computations related to image data and/or derived image data that cannot be processed by the image processing circuitry 282.

In operation, the image sensor 281 is configured to capture images as described above. The data from these images is sent to the image processing circuitry 282. In the embodiment of FIG. 33, the image data is sent via a high-speed bus 286. The image processing circuitry 282 can perform a number of operations on the imaged data, including filtering and adjusting the image data. In some embodiments, the image processing circuitry can address signal generated by light reflected from one or more optics of the luminaire and/or signal generated by other environmental artifacts. For example, the image processing circuitry can remove or exclude signal generated by light reflected from a glare shield employed in the luminaire architecture.

Further, the image processing circuitry 282 can determine derived image data from the image data. In general, the derived image data is a downsampled form of the image data. The derived image data can be provided in the normal course of operation of the sensor module 280. The supplemental image data processing circuitry 284 can perform one or more computations on the derived image data to determine an ambient light level and/or occupancy event. However, these computations can also be performed directly by the control system 285. Using the derived image data can allow the supplemental image data processing circuitry to use a first low-speed bus 287 to communicate with the image processing circuitry 282. Similarly, it can also enable the control system to communicate with a second low speed bus 288 with the supplemental image data processing circuitry 284 and/or directly with the image processing circuitry 282. This is due to the fact that the derived image data is downsampled when compared to the actual image data and, therefore, can be transferred quickly when compared to the actual image data. In situations wherein the derived image data is insufficient to accurately characterize the area surrounding the luminaire, the full image data can be transferred from the image processing circuitry 282 to the supplemental image data processing circuitry 284 via a second high speed bus 289 for further review. The image data can then be processed by the supplemental image data processing circuitry 284 and the necessary data sent via the second low speed bus 288 to the control system 285, or the full image data can also be sent to the control system 285, either directly from the image processing circuitry 282 via a third high speed bus 290 or indirectly from the supplemental image data processing circuitry 284 via the third high-speed bus 290.

The first high-speed bus 286, the second high-speed bus 289 and the third high-speed bus 290 can be a universal serial bus (USB), a peripheral component interconnect (PCI), an external serial advanced attachment (eSATA) bus of the like. The first low-speed bus 287 and second low-speed bus 288 can be any number of low-speed buses known in the art. For example, the first low-speed bus 287 and second low-speed bus 288 can be an RS-232 bus, a serial peripheral interface (SPI), an $I^2C$ bus or the like.

The control system 285 can use the image data and/or the derived image data to adjust one or more light output characteristics of the LED array 150. For example, the control system 285 can use the image data and/or derived image data to adjust color temperature, light intensity, color, vividness or the like of the light output by the LED array 150. An alternating current (AC) power source 291 can provide power for the control system 285 and LED array 150. Additional features of a sensor module comprising an image sensor and associated image processing are further described in U.S. patent application Ser. No. 14/928,592 filed Oct. 30, 2015, now U.S. Pat. No. 9,769,900, entitled "Lighting Fixture with Image Sensor Module," which is incorporated herein by reference in its entirety.

The image sensor can employ an optical assembly of any construction not inconsistent with the objectives of the present invention. In some embodiments, the optical assembly is a multi-element structure. For example, the optical assembly can generally comprise 3-6 optical elements. In some embodiments, the optical assembly of the image sensor does not include an infrared cut-off filter for excluding infrared radiation, including near-infrared radiation, from reaching the focal plane array. Exclusion of the IR cut-off filter can enhance the sensitivity of the image sensor for various sensing operations including occupancy detection at extremely low light levels. Alternatively, an IR cut-off filter can be employed in the optical assembly of the image sensor. The image sensor can have any field of view not inconsistent with the objectives of the present invention. As described above, the image sensor can have a field of view corresponding or substantially corresponding to an area that is illuminated by the luminaire. In some embodiments, the image sensor can have a field of view from 70 degrees to 120 degrees or 100 degrees to 110 degrees. The image sensor field of view can also exclude light reflected by one or more optics of the luminaire. For example, the image sensor field of view can exclude light reflected from a glare shield employed by the luminaire. In some embodiments, image sensor field of view is restricted by one or more masking or baffle structures to exclude light reflected by optic(s) of the luminaire. Alternatively, the image processing circuitry of the image sensor addresses signal generated by light reflected by luminaire optic(s). The image processing circuitry, for example, can exclude or subtract such signal during processing of image data. In further embodiments, masking or baffle structures are used in conjunction with image processing techniques to address light reflected by one or more luminaire optics.

In various embodiments described herein various smart technologies may be incorporated in luminaires described herein, such as in sensor assembly 130, as described in the following applications "Solid State Lighting Switches and Fixtures Providing Selectively Linked Dimming and Color Control and Methods of Operating," application Ser. No. 13/295,609, filed Nov. 14, 2011, now U.S. Pat. No. 8,736, 186, which is incorporated by reference herein in its entirety; "Master/Slave Arrangement for Lighting Fixture Modules," application Ser. No. 13/782,096, filed Mar. 1, 2013, now U.S. Pat. No. 9,572,226, which is incorporated by reference herein in its entirety; "Lighting Fixture for Automated Grouping," application Ser. No. 13/782,022, filed Mar. 1, 2013, now U.S. Pat. No. 9,155,165, which is incorporated by reference herein in its entirety; "Lighting Fixture for Distributed Control," application Ser. No. 13/782,040, filed Mar. 1, 2013, now U.S. Pat. No. 8,975,827, which is incorporated by reference herein in its entirety; "Efficient Routing Tables for Lighting Networks," application Ser. No. 13/782,053, filed Mar. 1, 2013, now U.S. Pat. No. 9,155,166, which is incorporated by reference herein in its entirety; "Handheld Device for Communicating with Lighting Fixtures," application Ser. No. 13/782,068, filed Mar. 1, 2013, now U.S. Pat. No. 9,433,061, which is incorporated by reference herein in its entirety; "Auto Commissioning Lighting Fixture," application Ser. No. 13/782,078, filed Mar. 1, 2013, now U.S. Pat. No. 8,829,821, which is incorporated by reference herein in its entirety; "Commissioning for a Lighting Network," application Ser. No. 13/782,131, filed Mar. 1, 2013, now U.S. Pat. No. 8,912,735, which is incorporated by reference herein in its entirety; "Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," application Ser. No. 14/052,336, filed Oct. 11, 2013, now U.S. Pat. No. 9,622,321, which is incorporated by reference herein in its entirety; and "Enhanced Network Lighting," application Ser. No. 61/932,058, filed Jan. 27, 2014, the subject matter of which was later filed in application Ser. No. 14/498,119, filed Sep. 26, 2014, now U.S. Pat. No. 9,706, 617, which is incorporated by reference herein in its entirety.

LED driver 140 can include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. Pat. No. 9,791,110, granted Oct. 17, 2017, entitled "High Efficiency Driver Circuit with Fast Response" by Hu et al., in U.S. Pat. No. 9,303,823, granted Apr. 5, 2016, entitled "SEPIC Driver Circuit with Low Input Current Ripple" by Hu et al., the entirety of these applications being incorporated by reference herein. The circuit may further be used with light control circuitry that controls color temperature of any of the embodiments disclosed herein, such as disclosed in U.S. patent application Ser. No. 14/292,286, filed May 30, 2014, now U.S. Pat. No. 10,278,250, entitled "Lighting Fixture Providing Variable CCT" by Pope et al., the entirety of this application being incorporated by reference herein. Additionally, any of the embodiments described herein can include driver circuitry disclosed in U.S. Pat. No. 9,730,289, granted Aug. 8, 2017, entitled "Solid State Light Fixtures Having Ultra-Low Dimming Capabilities and Related Driver Circuits and Methods," the entirety of this application being incorporated herein by reference.

In some embodiments, LED driver 140 can comprise a driver assembly disclosed in U.S. Pat. No. 10,234,127, granted Mar. 19, 2019, entitled "LED Luminaire Having Enhanced Thermal Management" by Bendtsen et al., the entirety of this application being incorporated by reference herein.

Additionally, LED driver 140 can include the smart lighting control technologies disclosed in U.S. Provisional Application Ser. No. 62/292,528, entitled "Distributed Lighting Network," the subject matter of which was later filed in application Ser. No. 16/932,959, filed Jul. 20, 2020, now U.S. Patent Publication No. 2020/0353011, assigned to the same assignee as the present application, the entirety of this application being incorporated herein by reference.

Any of the embodiments disclosed herein may be used in a luminaire having one or more communication components forming a part of the light control circuitry, such as an RF antenna that senses RF energy. Such communication components can in some instances be included in the LED driver 140 or in a separate driver communicatively connected to LED driver 140. The communication components may be included, for example, to allow the luminaire to communicate with other luminaires and/or with an external wireless controller, such as disclosed in U.S. patent application Ser. No. 13/782,040, filed Mar. 1, 2013, now U.S. Pat. No. 8,975,827, entitled "Lighting Fixture for Distributed Control" or U.S. Provisional Application No. 61/932,058, filed Jan. 27, 2014, entitled "Enhanced Network Lighting," the subject matter of which was later filed in application Ser. No. 14/498,119, filed Sep. 26, 2014, now U.S. Pat. No. 9,706, 617, both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control circuitry as described herein, such as those described with reference to sensor assembly 130.

Figure 34A:
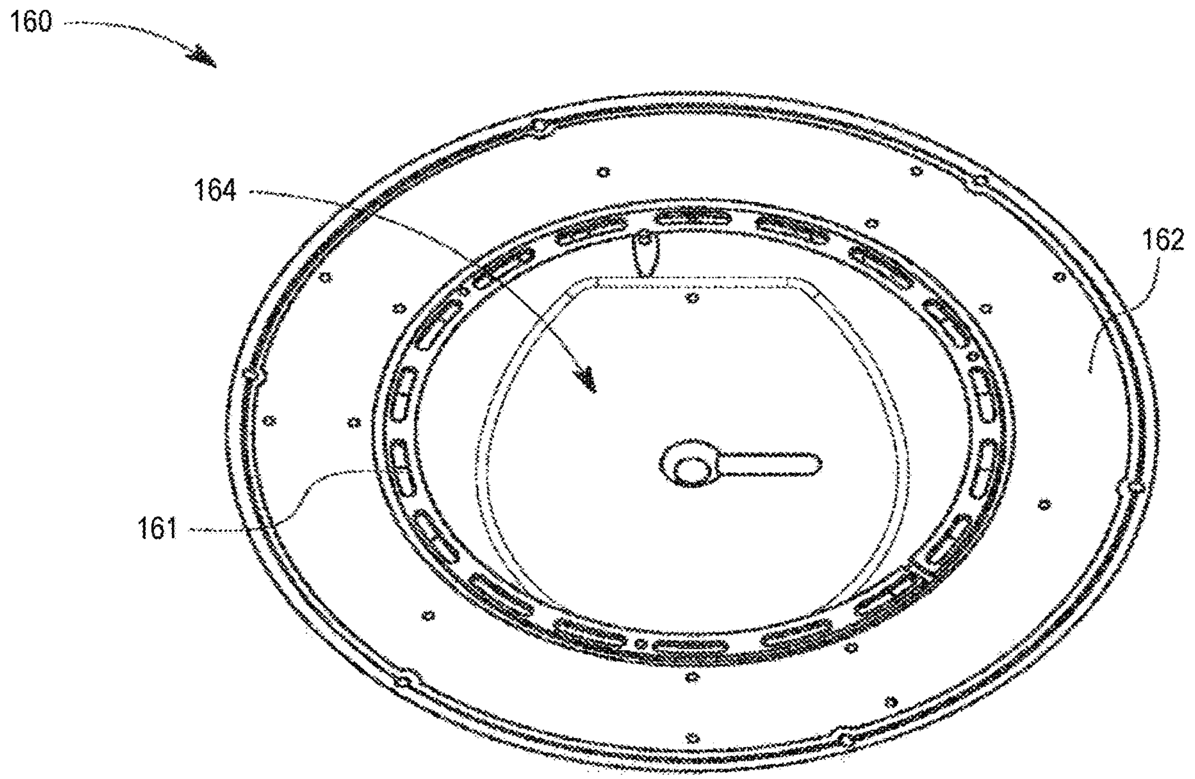
FIG. 34A is a bottom view of a heatsink assembly having a body and a housing according to some embodiments described herein.
Figure 34B:
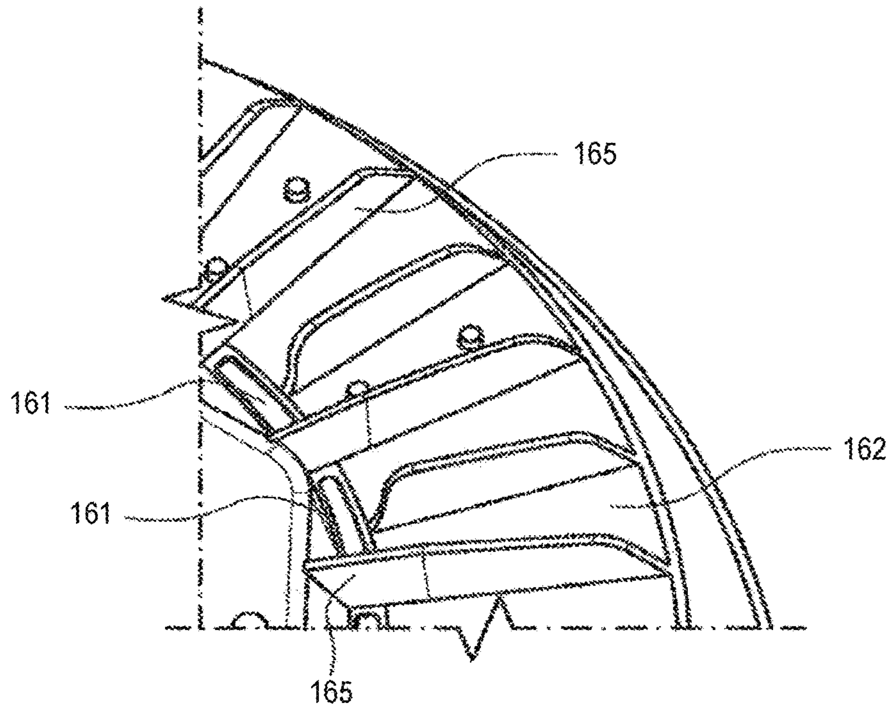
FIG. 34B is a partial perspective view of a top of a heatsink assembly having finned structures and vents according to some embodiments described herein.
Figure 34C:
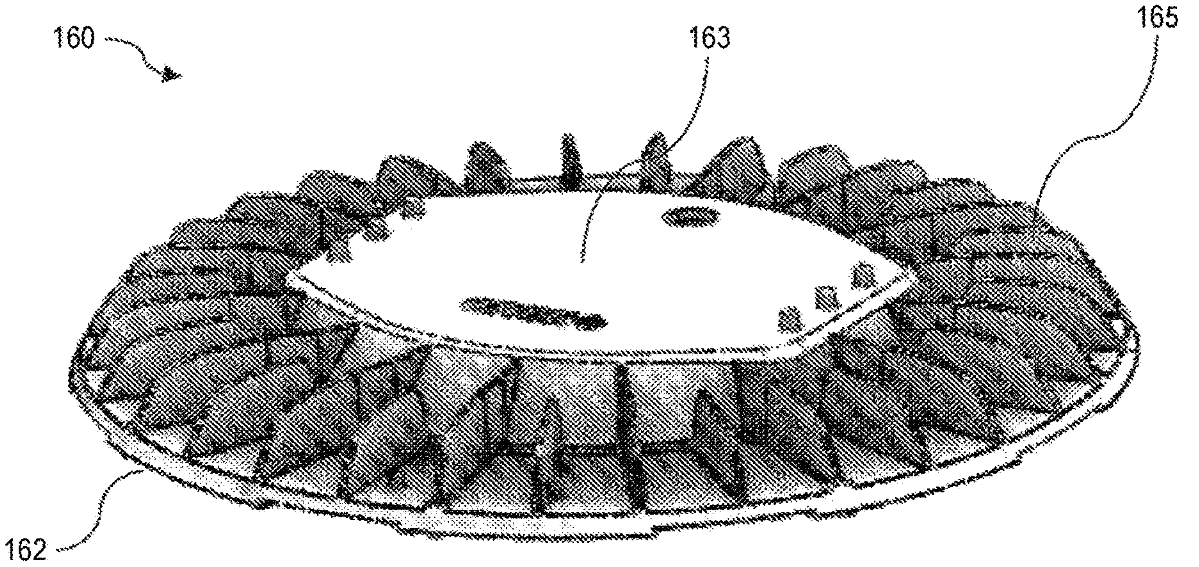
FIG. 34C is a perspective view of a heatsink assembly according to some embodiments described herein.

One embodiment of LED heatsink 160 is shown in particular detail in at least FIGS. 34A-34C, comprising a base having a radially extending mounting body 162, a central aperture 164 formed in the mounting body 162, and a housing 163 positioned proximate to the central aperture 164, and being connected, coupled, or attached to the mounting body 162. Housing 163 can comprise a component receiving space into which LED driver 140, various sensor components, backup battery, and the like can be positioned and housed. The component receiving space is generally denoted by reference 164 in FIG. 34A. In some embodiments, housing 163 and LED driver 140 can be combined into one unit to form a driver assembly described in U.S. Pat. No. 10,234,127, granted Mar. 19, 2019, entitled "LED Luminaire Having Enhanced Thermal Management" by Bendtsen et al., which has already been incorporated by reference in its entirety herein. In some embodiments, sensor assembly 130 can connect, attach, or be coupled to mounting body 162 or housing 163.

Finned structures 165 are positioned around central aperture 164. In some embodiments, finned structures 165 are positioned on an upward facing surface of mounting body 162, as particularly illustrated in FIGS. 30, 34B and 34C. Finned structures 165 can have any desired design including single fins, branched fins, curved fins and combinations thereof. The finned structures 165, housing 163, and body 162 can be independently formed of any suitable thermally conductive material.

In some embodiments, heatsink 160 can further comprise a plurality of cooling vents 161. As shown for example in the embodiments of at least FIGS. 29A, 29B, 34A, and 34B, cooling vents 161 can be positioned at an interface of where housing 163 and body 162 of heatsink 160 converge. In some instances, the plurality of cooling vents 161 are positioned proximate to the LED driver assembly 140. The cooling vents 161 permits an envelope of cooler air to flow between the finned structures 165 cooling the LED array 150, and the housing 163, sensor assembly 130, and/or driver assembly 140. This envelope of cooler air can establish a forced air boundary or barrier separating the convective cooling of the housing 163, sensor assembly 130, and/or driver assembly 140 from the convective cooling of the LED array 150. Little to no heated air from the LED array 150 contacts the heatsink 160 of the driver assembly 140, in some embodiments. Dimensions of the air envelope can be established and controlled by several considerations including, but not limited to, fin height and fin spacing of the heatsink 160, height of the driver assembly 140, housing 163, and/or distance of the finned structures 165 from the central aperture of the luminaire. For example, the ratio of driver assembly height to fin height should be sufficiently low to prevent warm or hot air from the heatsink 160 from re-converging on upper portions of the driver assembly 140, such as portions proximate the housing 163. In some embodiments, the ratio of driver assembly height to fin height is less than 1:5. Moreover, fins of the heatsink should have sufficient spacing to facilitate pulling air from the central aperture of the luminaire into the heatsink for cooling of the LED array. In some embodiments, the heatsink has a minimum fin-to-fin spacing of 0.180". In some embodiments, fin spacing of the heatsink is uniform. In other embodiments, fin spacing can be varied according to desired flow characteristics of the heatsink. Additionally, altering the distance of the fins from the central aperture of the luminaire can affect size of the air envelope. For example, in some embodiments, increasing the distance of the heatsink fins from the central aperture increases the size of the air envelope. One or more fins of the heatsink can also have geometry or design for managing dimensions of the air envelope. heatsink fins, in some embodiments, have curvature or design for directing convective air currents away from the housing 163, sensor assembly 130, and/or driver assembly 140. Such embodiments can further preclude or inhibit re-convergence of warm or hot air from the heatsink 160 on the housing 163, sensor assembly 130, and/or driver assembly 140 and enable higher values for the ratio of housing 163, sensor assembly 130, and/or driver assembly 140 height to fin height.

In some embodiments, the finned structures 165, housing 163, and body 162 are formed of a material having thermal conductivity of 3-300 W/m K. In some embodiments, finned structures 165, housing 163, and/or body 162 are fabricated from aluminum, steel sheet metal or other metal/alloy. For example, the finned structures 165, housing 163, and/or body 162 can be fabricated from aluminum or other metal by die-casting. In some embodiments, the finned structures 165 are fabricated independent of the body 162 and subsequently coupled to the body 162 by one or more techniques including fasteners, soldering, or bonding by adhesive. Such embodiments provide significant design freedom regarding composition and density of the finned structures 165. Similarly, in some instances, body 162 and housing 163 are fabricated independently from each other, and subsequently coupled or connected by one or more techniques including fasteners, soldering, or bonding by adhesive. In some embodiments, the finned structures 165, housing 163, and body 162 are formed of the same material. In other embodiments, the finned structures 165, housing 163, and body 162 are formed of differing materials. For example, the finned structures 165 can be an extruded polymeric material or aluminum alloy, the house 163 a stamped sheet metal, and the body 162 a cast metal. Design and structure of the LED heatsink 160 can be governed by several considerations, including cooling requirements for the LED array and cost factors.

Figure 35:
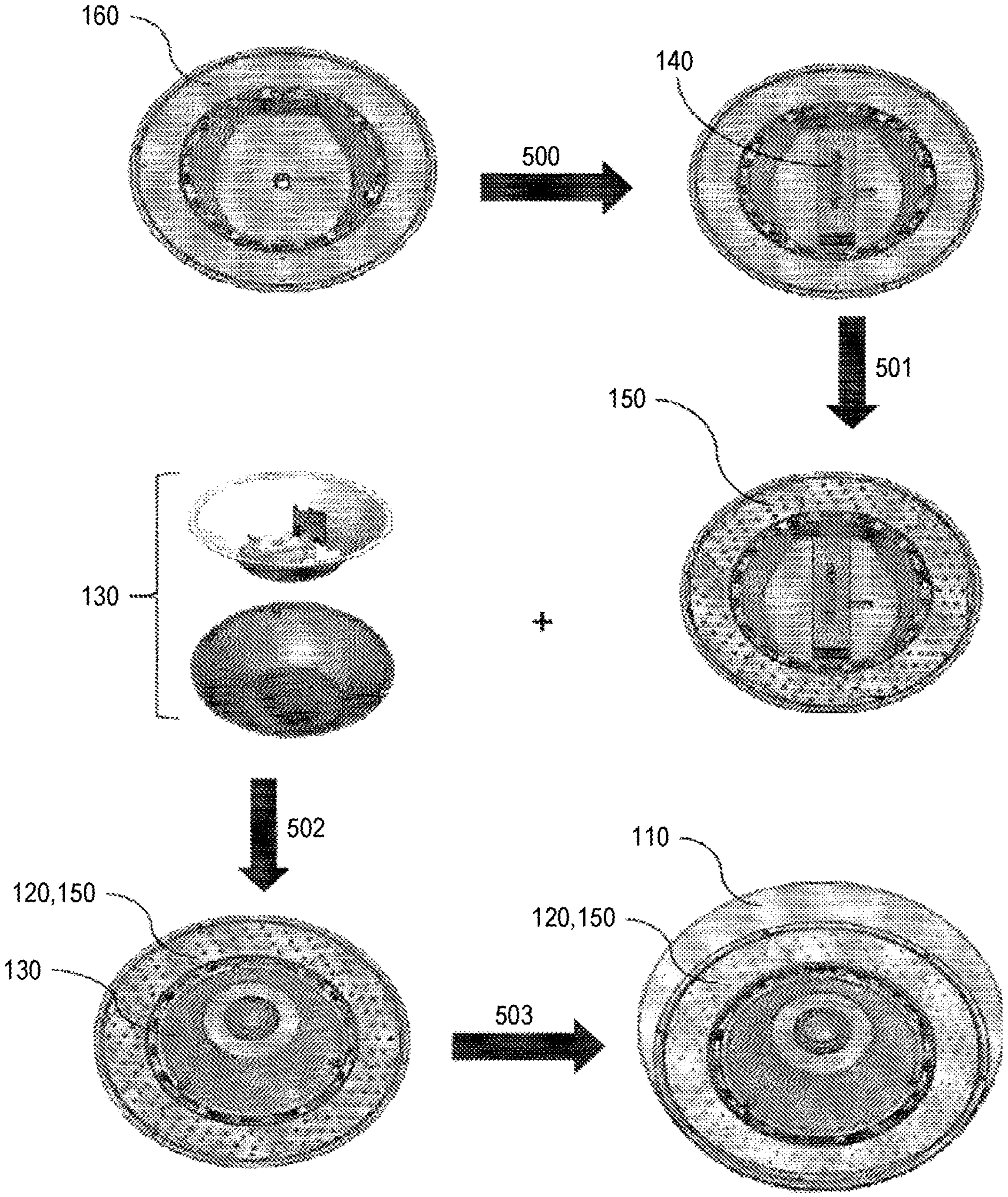
FIG. 35 illustrates a single orientation assembly process of a luminaire according to some embodiments described herein.

Assembly of one luminaire embodiment is shown in FIG. 35. First, heatsink 160 is placed with the heating fins 165 facing downwards, and a light emitting end facing upward. Then the driver 140 and other electrical components are secured on a surface of the light emitting end of heatsink 160 at step 500, such as in housing 163 in the central aperture 164. LED assembly/array 150 is secured to the surface of the light emitting end of heatsink 160, such that the driver 140 and other electrical components are positioned within or proximate to the central aperture 154 of the LED array 150 at step 501. At step 502, sensor assembly 130, including any communication modules or features described herein, are assembled and positioned within or proximate to the central aperture 154 of the LED array 150, and mechanically connected to heatsink 160 through fasteners and/or adhesives. Finally, optic 120 is positioned over LED array 150 at step 503. Glare shield 110 can optionally be connected to the heatsink 160 at step 503. One particular advantage of the assembly process illustrated in FIG. 35, is that the assembly of the luminaire is a single orientation assembly, meaning that the entire luminaire can be assembled from one direction, in contrast to other convention assembly methods that require the assembly to be assembled from both the light emitting end of heatsink 160 and the opposite top end of heatsink 160. Moreover, disassembly of the luminaire can also be performed from the light emitting end, allowing sensor assemblies, LED drivers, and LED arrays to readily and easily be replaced or upgraded without removal of the luminaire from its installation.

Figure 30:
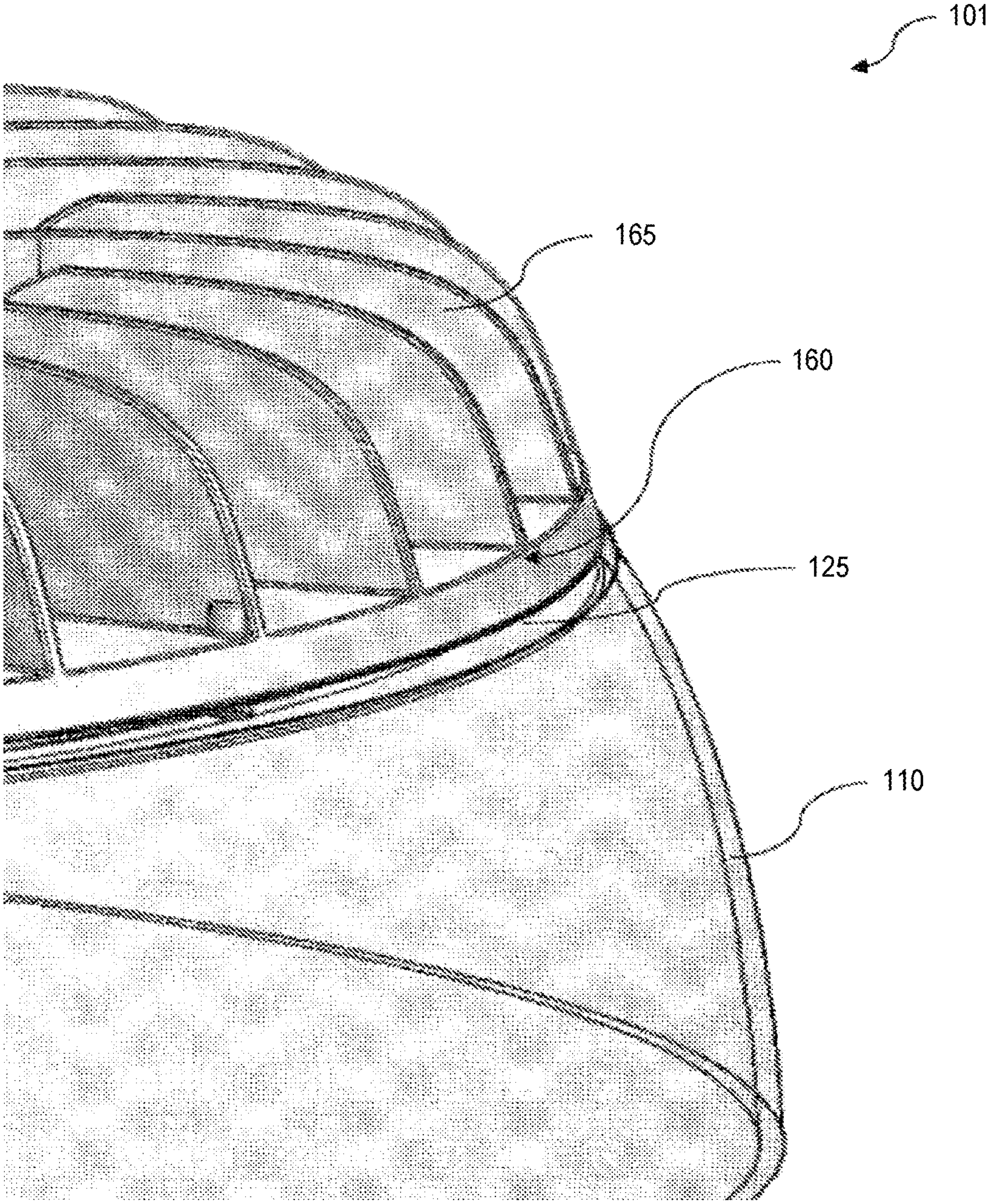
FIG. 30 is a partial perspective view of an assembled luminaire having an exposed waveguide edge according to some embodiments described herein.

FIG. 30 shows a partial perspective view of an assembled luminaire 101. As shown, the waveguide edge 125 of optic 120 is positioned between glare shield 110 and heatsink 160. When optic 120 receives light from the LED array 150, light can be emitted from the waveguide edge 125 in one or more up-lighting distributions, such as those shown in the ray diagram of FIG. 27.

Figure 36:
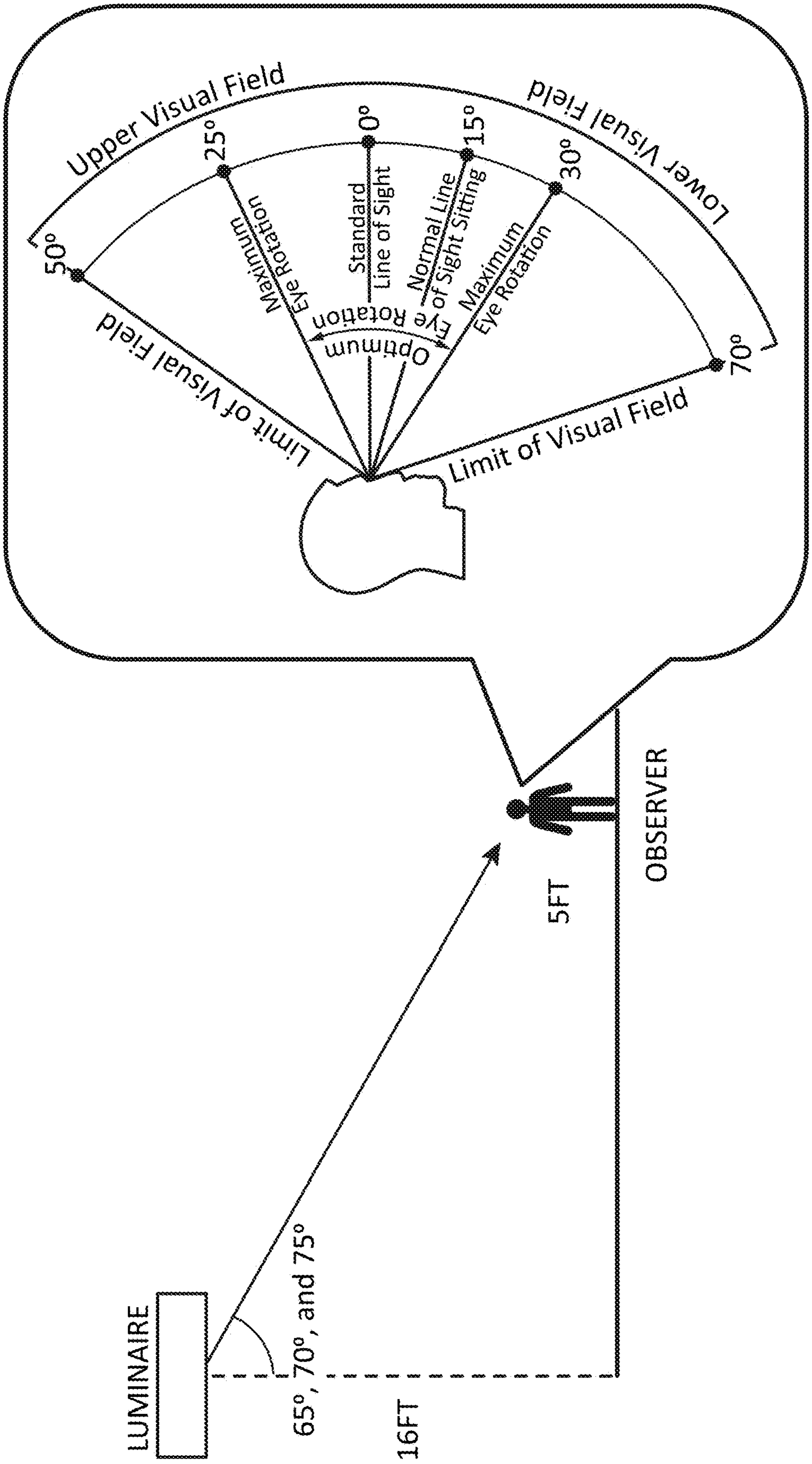
FIG. 36 illustrates glare characterized at viewing angles of 65 degrees, 70 degrees, and 75 degrees relative to nadir.

Luminaires described herein can in some instances, can have a reduced glare compared to traditional luminaires, where glare is characterized as a ratio of max luminance value to a total lumen output of the luminaire at a given viewing angle. For example, as shown in FIG. 36, the glare can be characterized at viewing angles of 65 degrees, 70 degrees, and 75 degrees relative to nadir. As described herein, the ratio of max luminance value to the total lumen output is determined by near field photometry rather than far field photometry at a range of less than eight times a distance of a light source size. Some luminaires described herein have a ratio of max luminance at 65 degrees from nadir to total lumen output from the luminaire that is less than 9, less than 8, less than 7, less than 6, less than 5, less than 4, less than 3, or less than 2. In some embodiments, luminaires described herein have a ratio of max luminance at 70 degrees from nadir to total lumen output from the luminaire that is less than 7, less than 6, less than 5, less than 4, less than 3, or less than 2. In some cases, luminaires described herein have a ratio of max luminance at 75 degrees from nadir to total lumen output from the luminaire that is less than 6, less than 5, less than 4, less than 3, or less than 2. In one non-limiting example, a luminaire described herein can comprise a LED array, and an optic covering the LED array, the optic comprising a radial arrangement of micro-optical structures providing a ratio of max luminance at 65 degrees from nadir to total lumen output from the luminaire of less than 7.

In some embodiments, luminaires described herein can have a luminance at 65 degrees from nadir is less than $3\times10^5$ cd/m$^2$, less than $2.5\times10^5$ cd/m$^2$, less than $2\times10^5$ cd/m$^2$, less than $1\times10^5$ cd/m$^2$, or less than less than $9\times10^4$ cd/m$^2$.

In another aspect, lighting system are contemplated comprising a plurality of luminaires arranged over or positioned across an area enclosed by walls, the luminaires being any luminaire embodiment described herein, wherein the optic of luminaires adjacent to the walls differs from the optic of luminaires over a central region of the area. For example, in some embodiments the optic of luminaires adjacent to the walls provides an asymmetric down lighting distribution, and the optic of luminaires over the central region provides a symmetric down lighting distribution. The asymmetric down lighting distribution of the luminaires adjacent to walls can, in some cases, direct a portion of the down lighting distribution onto the adjacent walls to provide even or uneven lighting on the walls (i.e. wall wash lighting). Moreover, one or more of the luminaires in the lighting system can provide up-lighting distributions through the waveguide edge of the optic to illuminate dark areas of the ceilings and corners of the area to reduce the cave-like effect.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

The invention claimed is:

1. A luminaire comprising:

a light emitting diode (LED) array; and an optic covering the LED array, the optic comprising a concentric arrangement of optical structures for providing one or more down lighting distributions with a first portion of light received from the LED array, and a radially extending waveguide edge providing a lateral lighting distribution, an up-lighting distribution, or combination thereof with a second portion of light received from the LED array, wherein the waveguide edge is concentric with the optical structures, and the waveguide edge is positioned between a heat sink of the LED array and a glare shield of the luminaire, the heat sink comprising a plurality of cooling vents.

2. The luminaire of claim 1, wherein the optical structures vary in number and/or dimension between the concentric rings.

3. The luminaire of claim 1, wherein single optical structures are positioned over single LEDs in the LED array.

4. The luminaire of claim 1, wherein the optical structures are micro-scale optical structures, Fresnel optical structures, or combinations thereof.

5. The luminaire of claim 1, wherein the vents permit an envelope of cooler air to flow between finned structures of the heat sink.

6. The luminaire of claim 5, wherein the envelope of cooler air establishes a forced air barrier separating convective cooling of the heat sink from convective cooling of the LED array.

7. The luminaire of claim 1 further comprising a bezel positioned peripherally around the optic.

8. The luminaire of claim 7, wherein the bezel further shapes the lateral lighting distribution, the up-lighting distribution, or combination thereof.

9. The luminaire of claim 1, wherein the luminaire is coupled to a canopy sheet of an overhead canopy.

10. The luminaire of claim 9, wherein the heat sink and the LED array are positioned on opposite sides of the canopy sheet.

11. The luminaire of claim 9, wherein the canopy sheet comprises an aperture for receiving the luminaire.

12. The luminaire of claim 1, wherein a driver for the LED array is positioned at an angle of 0 degrees to less than 90 degrees relative to the LED array.

13. The luminaire of claim 12 further comprising a mounting bracket between the LED array and driver.

14. The luminaire of claim 1, wherein the optic is a single piece.

15. The luminaire of claim 1, wherein the optic is multiple pieces.

16. The luminaire of claim 1, wherein the concentric arrangement of the optical structures provides a symmetric down lighting distribution.

17. The luminaire of claim 1, wherein the concentric arrangement of the optical structures provides an asymmetric down lighting distribution.

18. The luminaire of claim 1, wherein the up-lighting distribution or lateral lighting distribution is symmetric.

19. The luminaire of claim 1, wherein the cooling vents are arranged around a base of the heat sink.

* * * * *